United States Patent [19]

Sato et al.

[11] Patent Number: 5,841,497
[45] Date of Patent: Nov. 24, 1998

[54] LIQUID CRYSTAL DEVICE AND LIQUID CRYSTAL APPARATUS

[75] Inventors: Koichi Sato; Kenji Shinjo, both of Atsugi; Masahiro Terada, Hadano; Syuji Yamada, Atsugi, all of Japan

[73] Assignee: Canon Kabushiki Kaisha, Tokyo, Japan

[21] Appl. No.: 681,350

[22] Filed: Jul. 23, 1996

[30] Foreign Application Priority Data

Jul. 28, 1995 [JP] Japan .................................. 7-211374
Jul. 28, 1995 [JP] Japan .................................. 7-211431

[51] Int. Cl.$^6$ ................................................. G02F 1/1337
[52] U.S. Cl. ..................... 349/128; 349/184; 252/299.01
[58] Field of Search ..................... 349/128, 184; 252/299.01, 299.61, 299.62, 299.63, 299.64, 299.65, 299.66, 299.67, 299.68

[56] References Cited

U.S. PATENT DOCUMENTS

| | | | |
|---|---|---|---|
| 4,367,924 | 1/1983 | Clark et al. | 350/334 |
| 4,778,259 | 10/1988 | Kitayama et al. | 350/350 S |
| 5,082,587 | 1/1992 | Janulis | 252/299.01 |
| 5,129,727 | 7/1992 | Hanyu et al. | 359/75 |
| 5,189,536 | 2/1993 | Hanyu et al. | 359/56 |
| 5,262,082 | 11/1993 | Janulis et al. | 252/299.01 |
| 5,268,783 | 12/1993 | Yoshinaga et al. | 359/103 |
| 5,320,883 | 6/1994 | Asaoka et al. | 428/1 |
| 5,417,883 | 5/1995 | Epstein et al. | 252/299.01 |
| 5,453,861 | 9/1995 | Shinjo et al. | 359/78 |
| 5,464,668 | 11/1995 | Asaoka et al. | 428/1 |
| 5,474,705 | 12/1995 | Janulis et al. | 252/299.01 |
| 5,475,515 | 12/1995 | Yoshinaga et al. | 359/52 |
| 5,510,159 | 4/1996 | Asaoka et al. | 428/1 |
| 5,540,858 | 7/1996 | Yoshinaga et al. | 252/299.01 |
| 5,658,491 | 8/1997 | Kistner et al. | 252/299.01 |

FOREIGN PATENT DOCUMENTS

| | | |
|---|---|---|
| 0646636 | 4/1995 | European Pat. Off. . |
| 0682098 | 11/1995 | European Pat. Off. . |
| 56-107216 | 1/1983 | Japan . |
| 59-193426 | 11/1984 | Japan . |
| 59-193427 | 11/1984 | Japan . |
| 60-156046 | 8/1985 | Japan . |
| 60-156047 | 8/1985 | Japan . |
| 021427563 | 5/1990 | Japan . |
| WO 22396 | 11/1993 | WIPO . |

OTHER PUBLICATIONS

Structures and Properties of Ferroelectric Liquid Crystals (1990) 344–357. Future Liquid Crystal Display and its Materials (1992) Ch. 3 and 5. 4th Intl. FLC Conf., p–46 (1993) 169–170.

(List continued on next page.)

*Primary Examiner*—John A. McPherson
*Attorney, Agent, or Firm*—Fitzpatrick, Cella, Harper & Scinto

[57] ABSTRACT

A liquid crystal device is constituted by a pair of substrates each having thereon an electrode for voltage application, a chiral smectic liquid crystal composition disposed between the substrates so as to assume at least two optically stable states. At least one of the substrates is provided with an alignment control layer having a thickness of at most 200 Å or comprising polyimide. The substrates have been subjected to different aligning treatments at their opposite faces each contacting the composition. The composition comprises at least three fluorine-containing mesomorphic compounds each comprising a fluorocarbon terminal portion and a hydrocarbon terminal portion, the terminal portions being connected with a central core, the compounds having smectic mesophase or latent smectic mesophase; said at least three mesomorphic compounds comprising a compound having a fluorocarbon terminal portion containing one catenary ether oxygen atom, a compound having a fluorocarbon terminal portion containing two catenary ether oxygen atoms, and a compound having a fluorocarbon terminal portion containing three catenary ether oxygen atoms. The above liquid crystal device is effective in improving a duration margin to provide good drive characteristic when driven.

21 Claims, 8 Drawing Sheets

OTHER PUBLICATIONS

M.Schadt & W.Helfrich, Appl. Phys. Lett., v. 18 No. 4, Feb. 15, 1971, pp. 127–128.

Y. Ouchi et al., Japanese Journal of Appl. Phys., v. 27 No. 5, May 1988, L725–L728.

A.D.L. Chandani et al., Japanese Journal of Applied Physics, v. 27 No. 5, May 1988, L729–L732.

LIQUID CRYSTAL DEVICE AND LIQUID CRYSTAL APPARATUS

FIELD OF THE INVENTION AND RELATED ART

The present invention relates to a liquid crystal device including a chiral smectic liquid crystal composition used as a light-valve for flat-panel displays, projection displays, printers, etc. The present invention also relates to a liquid crystal apparatus using the liquid crystal device.

There has been known a cathode ray tube (CRT) as a display device. The CRT has widely been used as a display terminal for outputting motion pictures of a television receiver or a video tape recording (VTR) apparatus or used as a monitor for a personal computer. However, the CRT encounters problems when outputs still images, in view of its characteristics, such that visibility or observability is liable to be lowered by, e.g., scanning fringe due to flicker or insufficient resolution and that degradation or deterioration of a fluorescent substance due to a surface memory is caused to occur in some cases. In recent years, it has been found that an electromagnetic wave generated by the CRT adversely affects human body. As a result, the CRT can break health of video display terminal (VDT) operators in some cases. In addition, the CRT has a structure including a large volume behind a picture area (display portion), whereby space-saving utilization of an office or a house in which the CRT is used is hindered and there is a possibility that the CRT fails to sufficiently play a part in displays in an advanced information-oriented society.

Liquid crystal devices have been used as a display device having solved the above-mentioned problems of the CRT. For instance, there have been known liquid crystal devices using use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

One of the above-mentioned TN-type liquid crystal devices is a simple matrix-type liquid crystal device having the advantage of inexpensive production costs. When the liquid crystal device is driven by using an electrode matrix structure with an improved pixel density in accordance with a multiplex driving scheme, the liquid crystal device is liable to encounter a problem of occurrence of crosstalk, so that the number of pixels is restricted. Further, the uses of the device as a display device is also limited since the response speed is too slow, i.e., on the order of at least several ten milliseconds.

In recent years, there have been proposed liquid crystal devices using a thin film transistor (TFT). These liquid crystal devices can control a display state pixel by pixel since each pixel is provided with a transistor, whereby the devices solve problems of crosstalk and response speed. However, as these devices have a larger picture area, it is industrially more difficult to prepare a liquid crystal device with no defective pixels. Even if it is possible to prepare such a liquid crystal device, the device is more expensive.

To overcome the above-mentioned drawbacks of such conventional liquid crystal devices, the use of liquid crystal devices using a liquid crystal material having bistability has been proposed by Clark and Lagerwall (e.g. Japanese Laid-Open Patent Appln. (JPA) No. 56-107216; U.S. Pat. No. 4,367,924, etc.). In this instance, as the liquid crystal material having bistability, a ferroelectric liquid crystal having chiral smectic C-phase (SmC*) or H-phase (SmH*) is generally used. The ferroelectric liquid crystal can effect inversion switching due to its spontaneous polarization, thus showing a very high response speed. Further, the ferroelectric liquid crystal shows at least two stable states including bistable states providing a memory characteristic and is excellent in view angle characteristics, so that a liquid crystal device using a ferroelectric liquid crystal is considered suitable for a display device or light-valve having properties including high-speed responsiveness, high resolution and a large picture area. In recent years, there has been proposed an anti-ferroelectric chiral smectic liquid crystal device assuming three stable states, as described in "Japanese Journal of Applied Physics" vol. 27, p. L729 (1988) by Chanani and Takezoe et al.

Such a liquid crystal device using a chiral smectic liquid crystal, however, encounters a problem such that a contrast ratio is lowered by occurrence of zig-zag alignment defects in some cases, as described in "Structures and Properties of Ferroelectric Liquid Crystals" (1990) by Atsuo Fukuda and Hideo Takezoe issued by Corona Publishing Co. Ltd. (Tokyo Japan). The reason why the zigzag defect occurs may be attributable to the fact that a layer of a chiral smectic liquid crystal disposed between a pair of substrates constituting a cell structure includes two kinds of chevron layer structures.

On the other hand there has been the recent trend in layer structure of a (chiral smectic) liquid crystal wherein a high contrast ratio is intended to be realized by suppressing a chevron layer structure resulting in a low contrast ratio and providing the liquid crystal with a bookshelf layer structure (hereinafter referred to as "bookshelf structure") in which boundaries of each liquid crystal layer are disposed in parallel with each other or with a structure closer to the bookshelf structure (e.g., Atsuo Fukuda (Editor)) "Future Liquid Crystal Display and Its Materials" (1992), issued by K.K. CMC (Tokyo Japan). One of methods for realizing a bookshelf structure is a method of using a naphthalene-based liquid crystal material having a particular structure. In this method, however, the resultant liquid crystal device has a tilt angle of about 10 degrees, which is considerably smaller than an ideal tilt angle of 22.5 degrees providing a maximum transmittance, thus resulting in a low transmittance or a low contrast. In addition, such a liquid crystal material fails to exhibit a bookshelf structure reversibly with respect to temperature in many cases. Another method for giving a bookshelf structure may include one inducing a bookshelf structure by externally applying an electric field to a liquid crystal device. Such a method, however, involves a problem of unstability against external stimuli such as temperature. In addition, various other problems to be solved are presumably present in order to put a liquid crystal material exhibiting a bookshelf structure into practical use since such a material has quite recently been discovered or proposed.

Further, in quite recent years, there have been proposed a mesomorphic (liquid crystal) compound having a perfluoroether terminal portion (U.S. Pat. Nos. 5,082,587 and 5,262,082 and International Publication No. WO93/22396) and a liquid crystal composition (Marc D. Radcliffe et al: The 4th International Ferroelectric Liquid Crystal Conference, P-46 (1993)) as materials exhibiting a bookshelf structure or a structure closer thereto. By using these liquid crystal materials, it is possible to provide a bookshelf structure or a structure showing a small layer inclination angle closer to the bookshelf structure without using external fields such as an external electric field. Accordingly, these liquid crystal materials are suitable for a liquid crystal device and display apparatus providing high speed responsiveness, high definition and large picture area.

However, these liquid crystal materials (compounds and compositions) still leave room for improvement in several characteristics, such as response speed, alignment characteristic, contrast and driving stability, singly or in combination thereof for the purpose of providing a high performance liquid crystal device or apparatus.

SUMMARY OF THE INVENTION

An object of the present invention is to provide a liquid crystal device using a chiral smectic liquid crystal composition showing an alignment state exhibiting a bookshelf structure or a structure, having a small layer inclination angle, closer to the bookshelf structure with respect to a smectic layer structure, in order to realize a large-area chiral smectic liquid crystal device having improved properties such as high responsiveness, high contrast, high definition, high brightness and high reliability Another object of the present invention is to provide a liquid crystal apparatus using the liquid crystal device.

According to the present invention, there is provided a liquid crystal device, comprising: a pair of substrates each having thereon an electrode for voltage application, a chiral smectic liquid crystal composition disposed between the substrates so as to assume at least two optically stable states, wherein at least one of the substrates is provided with an alignment control layer having a thickness of at most 200 Å and the substrates have been subjected to different aligning treatments at their opposite (inner) faces each contacting the chiral smectic liquid crystal composition, and the chiral smectic liquid crystal composition comprises at least three fluorine-containing mesomorphic compounds each comprising a fluorocarbon terminal portion and a hydrocarbon terminal portion connected with a central core and having a smectic phase or a latent smectic phase; the above-mentioned at least three mesomorphic compounds comprising at least one species of a compound having a perfluoroether group containing one catenary ether oxygen atom, at least one species of a compound having a perfluoroether group containing two catenary ether oxygen atoms, and at least one species of a compound having a perfluoroether group containing three catenary ether oxygen atoms.

The present invention also provides a liquid crystal device, comprising: a pair of substrates each having thereon an electrode for voltage application, a chiral smectic liquid crystal composition disposed between the substrates so as to assume at least two optically stable states, wherein at least one of the substrates is provided with an alignment control layer comprising polyimide and the substrates have been subjected to different aligning treatments at their opposite faces each contacting the chiral smectic liquid crystal composition, and the chiral smectic liquid crystal composition comprises at least three fluorine-containing mesomorphic compounds each comprising a fluorocarbon terminal portion and a hydrocarbon terminal portion connected with a central core and having a smectic phase or a latent smectic phase; the above-mentioned at least three mesomorphic compounds comprising at least one species of a compound having a perfluoroether group containing one catenary ether oxygen atom, at least one species of a compound having a perfluoroether group containing two catenary ether oxygen atoms, and at least one species of a compound having a perfluoroether group containing three catenary ether oxygen atoms.

The present invention further provides liquid crystal apparatus including the above-mentioned liquid crystal devices, respectively.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
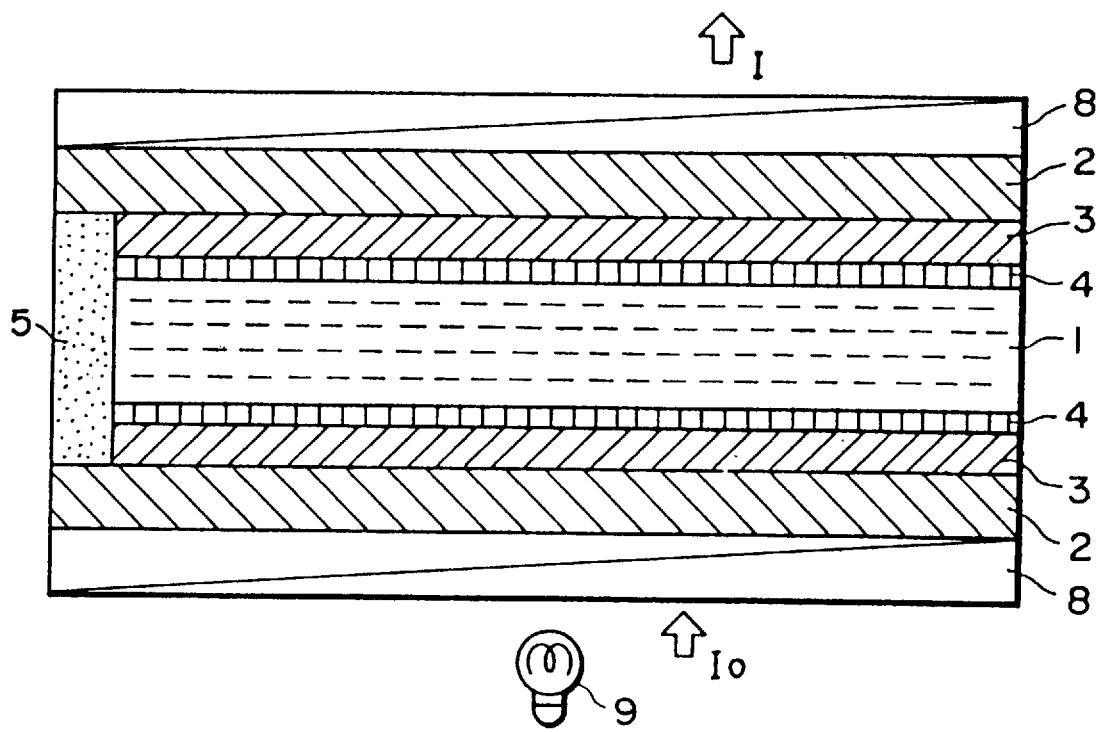
FIG. 1 is a schematic sectional view of an embodiment of a liquid crystal device according to the present invention.

The liquid crystal device according to the present invention is characterized by a specific cell structure wherein a chiral smectic liquid crystal composition is sandwiched between a pair of electrode plates (substrates having thereon electrodes, respectively) treated so as to have different alignment control abilities.

The chiral smectic liquid crystal composition comprises at least three fluorine-containing mesomorphic compounds including at least one species of a compound having a perfluoroether group (fluorocarbon terminal portion) containing one catenary ether oxygen atom, at least one species of a compound having a perfluoroether group containing two catenary ether oxygen atoms, and at least one species of a compound having a perfluoroether group containing three catenary ether oxygen atoms. Herein, the "catenary ether oxygen atom" means an ether oxygen atom present in a perfluoroether chain and located between adjacent carbon atoms.

Each of the fluorine-containing mesomorphic compounds contains a fluorocarbon terminal portion (i.e., perfluoroether group) having at least one caternary ether oxyge atom, a hydrocarbon terminal portion, and a central core connecting the terminal portions and assumes a smectic (mesomorphic) phase or a latent smectic (mesomorphic) phase (hereinafter, referred to as a "perfluoroether-type mesomorphic compound"). Herein, the compound having a latent smectic mesophase (or latent smectic phase) means a compound not showing (exhibiting) a smectic (meso)phase by itself but showing a smectic (meso)phase when used together with a compound showing a smectic (meso)phase or another compound having a latent smectic (meso)phase.

The term "mesomorphic compound" used herein covers not only a compound assuming a mesomorphic phase (mesophase) but also a compound not assuming a mesomorphic phase per se as long as a liquid crystal composition containing such a compound assumes a mesomorphic phase.

On the other hand, the above-described different alignment control abilities provided to the pair of electrode plates (substrates provided with electrodes) are given by forming an alignment control layer having a thickness of at most 200 Å or an alignment control layer consisting of a polyimide film on at least one of the electrode plates and optionally subjecting such an alignment control layer to an appropriate aligning treatment (e.g., rubbing).

In the present invention, by using the chiral smectic liquid crystal and the substrates subjected to different aligning treatments (including different materials and different aligning methods) in combination, it is possible to realize a (chiral smectic) liquid crystal device stably providing an initial alignment states of liquid crystal molecules, such that a smectic layer structure is a bookshelf structure or closer to the bookshelf structure, and exhibiting good drive characteristics (particularly, a good drive margin, such as a voltage application time margin described hereinbelow) in a wide temperature range where the above alignment state is attained.

Hereinbelow, the liquid crystal device of the present invention will be described specifically with reference to FIG. 1.

FIG. 1 is a schematic sectional view of an embodiment of the liquid crystal device for explanation of the structure thereof.

Referring to FIG. 1, the liquid crystal device includes a liquid crystal layer 1 comprising a chiral smectic liquid crystal composition containing at least three perfluoroether-type mesomorphic compounds (as main components) disposed between a pair of substrates 2 each having thereon a group of transparent electrodes 3 and an alignment control layer 4. In the present invention, however the alignment control layer 4 may be formed on one of the substrates 2. The substrates 2 are placed or arranged opposite each other. The periphery of the substrates 2 is sealed up with a sealing agent 5. Outside the substrates 2, a pair of polarizers 8 are disposed so as to modulate incident light $I_0$ from a light source 9 in cooperation with the liquid crystal 1 to provide modulated light I.

The liquid crystal layer 1 may preferably have a thickness (corresponding to a cell gap) of at most 5 μm, more preferably about 0.5–3 μm, in order to exhibit at least two optically stable states. Each of two substrates 2 comprise glass or plastic and is coated with a transparent electrode 3 having a prescribed pattern (e.g., stripe pattern) and comprising a film of $SnO_2$, $In_2O_3$ or ITO (indium-tin-oxide) to form an electrode plate. On at least one of the substrates 2, the alignment control layer 4 is formed via an insulating layer (not shown), as desired, by applying a solution containing a material for the alignment control layer or by vapor deposition or sputtering of a material for the alignment control layer. Examples of the material for the alignment control layer 4 may include: an inorganic material, such as silicon monoxide, silicon dioxide, aluminum oxide, zirconium oxide, magnesium fluoride, cerium oxide, cerium fluoride, silicon nitride, silicon carbide, or boron nitride; and an organic material, such as polyvinyl alcohol, polyimide, polyamide-imide, polyester, polyamide, polyester-imide, polyparaxylylene, polycarbonate, polyvinyl acetal, polyvinyl chloride, polystyrene, polysiloxane, cellulose resin, melamine resin, urea resin or acrylic resin. The surface of thus prepared alignment control layer 4 is subjected to a prescribed (uniaxial) alignment treatment, as desired, e.g., by rubbing the surface with a fibrous material such as velvet, cloth or paper. The alignment control layer 4 may be formed by an oblique vapor deposition method wherein a film of an oxide such as $SiO_2$ or an nitride is vapor-deposited on the electrode plate(s) from an oblique direction to the electrode plate.

The liquid crystal device of the invention may further comprise a short circuit-preventing layer for the pair of substrates such as an insulating layer, an inorganic material layer and an organic material layer other than those for the above-mentioned alignment control layer. The pair of substrates 2 are held to have a prescribed (but arbitrary) gap (e.g., at most 5 μm, preferably 0.5–3 μm) with a gap-controlling spacer (not shown) of, e.g., silica beads or alumina beads. A voltage is applied to the liquid crystal layer 1 in accordance with a switching signal from a signal power supply (not shown), thus effecting switching. As a result, the liquid crystal device functions as a light valve such a display device. Further, in case where two groups of electrodes are arranged in matrix (so as to intersect with each other, e.g., at right angles) on the pair of substrates, it is possible to perform pattern display and pattern exposure, so that the liquid crystal device is used as a display device for a personal computer, a word processor, etc., or a light valve for a printer.

In the liquid crystal device of the present invention, as described above, the pair of substrates are subjected to different aligning treatments in order to appropriately control an alignment (orientation) state, particularly an initial alignment state, of liquid crystal molecules of the chiral smectic liquid crystal composition containing three types of the fluorine-containing (perfloroether-type) mesomorphic compounds. Specifically, for example, one of the substrates is provided with a rubbing-treated alignment control layer and the other substrate is provided with an alignment control film not subjected to rubbing and comprising a material identical to or different from that of the rubbing-treated alignment control layer.

The liquid crystal device of the present invention includes at least one alignment control layer having a thickness of at most 200 Å or at least one alignment control layer consisting of a polyimide film.

The former alignment control layer may preferably have a thickness of at most 100 Å, more preferably at most 50 Å, in order to allow good driving characteristics, a high reliability and a driving stability in a wide temperature range.

The latter alignment control layer (polyimide alignment control layer) may generally be prepared by applying a polyamic acid (polyimide precursor) solution onto the surface (electrodes) of the substrate(s), heating the applied (coating) layer and subjecting the above-described rubbing treatment.

In the present invention, when the polyimide alignment control layer is used in combination with the chiral smectic liquid crystal composition disposed between the pair of substrates subjected to different aligning treatments, it is possible to attain a liquid crystal device providing good driving characteristics, a high reliability and a driving stability in a very wide temperature range. Particularly, by using a polyimide alignment control layer having a small thickness (at most 200 Å) subjected to rubbing treatment formed on one substrate and an alignment control layer consisting of other materials (e.g., a layer of a silane coupling agent) not subjected to rubbing treatment on the other substrate in combination, it is possible to provide a particularly stable alignment control ability and excellent drive characteristics.

In view of ease of formation and a high alignment control ability, the alignment control layer 4 may preferably comprise a polyimide film represented by the following formula (III) as a recurring unit.

Formula (III)
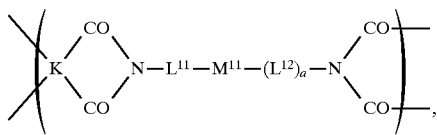
in which
K is
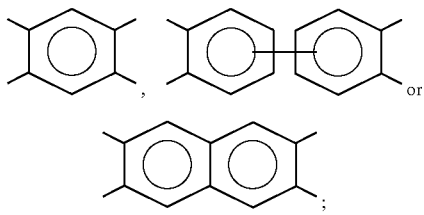
$L^{11}$ and $L^{12}$ independently denote
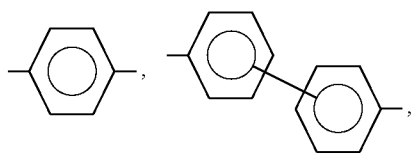
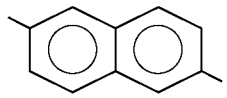
or an alkylene group having 1–20 carbon atoms;
$M^{11}$ is a single bond or —O—; and
a is 0, 1 or 2.
Specific examples of the polyimide of the formula (III) include those having the following recurring units shown below.
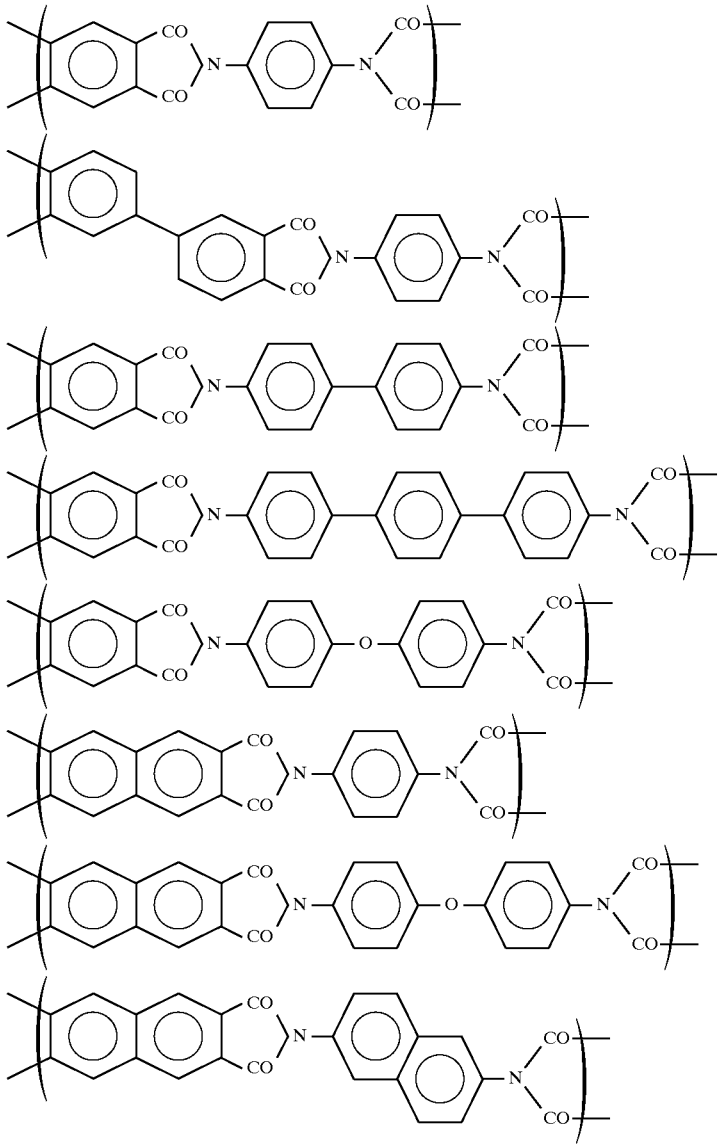

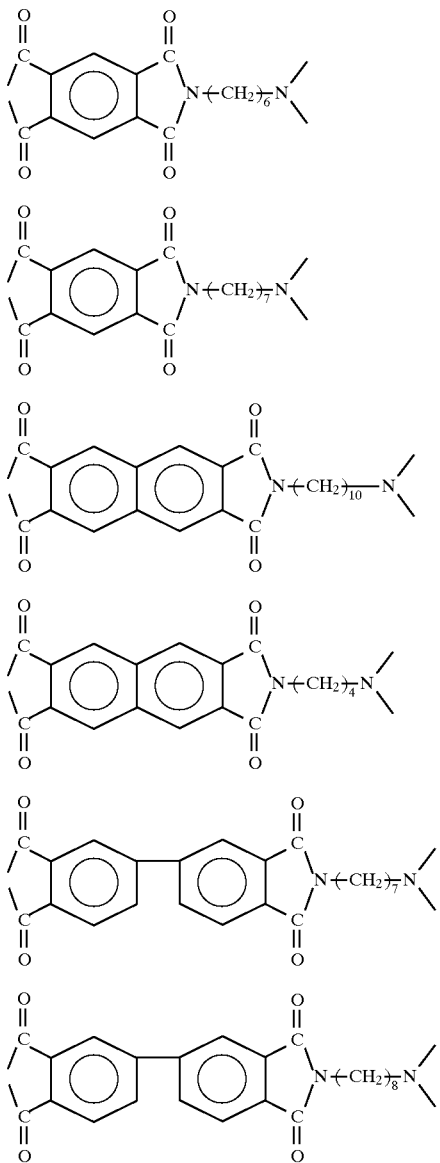

In general, the perfluoroether-type mesomorphic compound used in the present invention have a central core comprised of at least two rings independently selected from aromatic, heteroaromatic, cycloaliphatic, or cycloaliphatic rings, connected one with another by a covalent bond or by groups selected from —COO—, —COS—, —NC=N—, —COSe—. Rings may be fused or non-fused. Heteroatoms within the heteroaromatic ring comprise at least one atom selected from N, O, or S. Non-adjacent methylene groups in cycloaliphatic rings may be substituted by O or S atoms.

The central core may more preferably be one containing a benzene ring and a pyrimidine ring.

As described above, the chiral smectic liquid crystal composition used in the present invention contains three essential components comprising at least one species of a perfluoroether-type (fluorine-containing) mesomorphic compound having one catenary ether oxygen atom (hereinafter, called "first perfluoroether-type mesomorphic compound"), at least one species of a perfluoroether-type mesomorphic compound having two catenary ether oxygen atoms (hereinafter, called "second perfluoroether-type mesomorphic compound"), and at least one species of a perfluoroether-type mesomorphic compound having three catenary ether oxygen atoms (hereinafter, called "third perfluoroether-type mesomorphic compound").

These perfluoroether-type mesomorphic compounds having 1–3 catenary ether oxygen atoms (first to third perfluoroether-type mesomorphic compounds) may include compounds described in U.S. Pat. No. 5,262,082, WO93/22396, and The 4th Int'l FLC conference, P-46 (1993) (Marc D. Radcliffe et al).

The first to third perfluoroether-type mesomorphic compounds may preferably contain a fluorocarbon terminal portion (perfluoroether group) represented by the following structure:

—$D^2$—($C_{xb}F_{2xb}$—O)$_{za}$—$C_{ya}F_{2ya+1}$, where xb is independently 1–10 for each ($C_{xb}F_{2xb}$—O); ya is 1–10; za is 1–10; —$D^2$— is —CO—O—$C_{rc}H_{2rc}$, —O—$C_{rc}H_{2rc}$—, —$C_{rc}H_{2rc}$—, —O—($C_{sa}H_{2sa}$—O)$_{ta}$—$C_{rd}H_{2rd}$—, —O—$SO_2$—, —$SO_2$—, —$SO_2$—$C_{rc}H_{2rc}$—, —$C_{rc}H_{2rc}$—N $(C_{pb}H_{2pb+1})$—$SO_2$—, —$C_{rc}H_{2rc}$—$N(C_{pb}H_{2pb+1})$—CO—, or a covalent bond where rc and rd are independently 1–20; sa is independently 1–10 for each $(C_{sa}H_{2sa}$—O); ta is 1–6; and pb is 0–4.

Each of the first to third perfluoroethertype (fluorine-containing) mesomorphic compounds may more preferably be represented by the following general formula (II):

Formula (II):

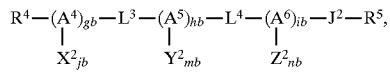

where $A^4$, $A^5$ and $A^6$ are each independently denote

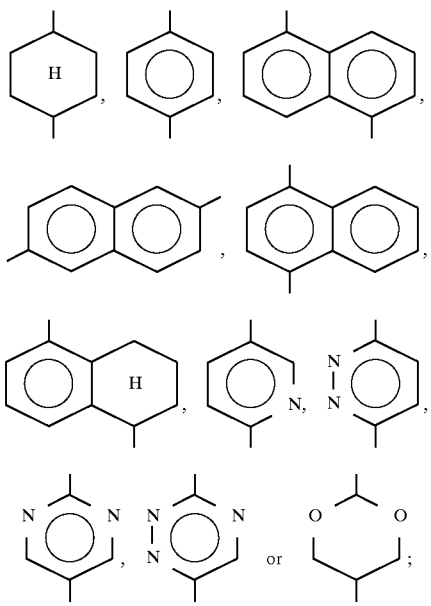

gb, hb and ib are each independently an integer of 0–3 with the proviso that the sum of gb+hb+ib be at least 2;

each $L^3$ and $L^4$ are independently a single bond, —CO—O—, —O—CO—, —CO—S—, —S—CO—, —CO—Se—, —Se—CO—, —CO—Te—, —Te—CO—, —$(CH_2CH_2)_{ka}$— (ka is 1–4), —CH=CH—, —C≡C—, —CH=N—, —N=CH—, —$CH_2$—O—, —O—$CH_2$—, —CO— or —O—;

$x^2$, $y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —$OCH_3$, —$CH_3$, —$CF_3$, —O—$CF_3$, —CN or —$NO_2$; each jb, mb and nb are independently an integer of 0–4;

$J^2$ is —CO—O—$C_{rc}H_{2rc}$—, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N$(C_{pb}H_{2pb+1})$—$SO_2$— or —$C_{rc}H_{2rc}$—N$(C_{pb}H_{2pb+1})$—CO— where rc and rd are independently 1–20; sa is independently 1–10 for each $(C_{sa}H_{2sa}$—O), ta is 1–6; pb is 0–4;

$R^4$ is —O—$(C_{qc}H_{2qc}$—O$)_{wa}$—$C_{qb}H_{2qb+1}$, —$(C_{qc}H_{2qc}$—O$)_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$ or O—CO—$C_{qc}H_{2qc}$—$R^6$ which may be either straight chain or branched where $R^6$ is —O—CO—$C_{qd}H_{2qd+1}$; —CO—O—$C_{qd}H_{2qd+1}$, —Cl, —F, —$CF_3$, —$NO_2$, —CN or —H; qc and qd are independently 1–20; wa is 1–10;

$R^5$ is $(C_{xb}F_{2xb}$—O$)_{za}$—$C_{ya}F_{2ya+1}$, wherein xb is independently 1–10 for each $(C_{xb}F_{2xb}$—O); ya is 1–10; and za is 1–10.

The first to third perfluoroether-type mesomorphic compounds represented by the formula (II) may be synthesized through processes similar to those descried in JP-A (Kohyo) 7-506368 and WO93/22396. Specific examples of such mesomorphic compounds of the formula (II) may include those (Example Compound Nos. II-1 to II-45) shown below.

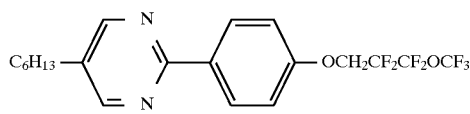

II-1

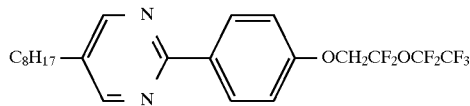

II-2

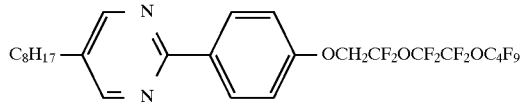

II-3

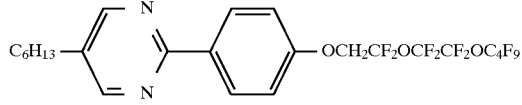

II-4

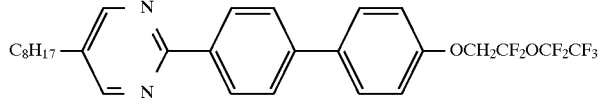

II-5

-continued
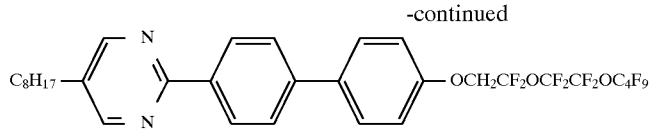
II-6
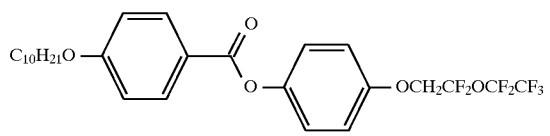
II-7
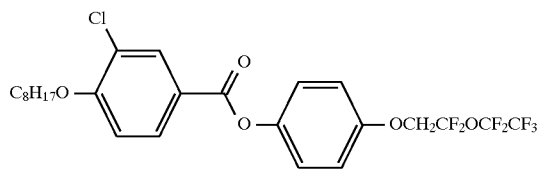
II-8
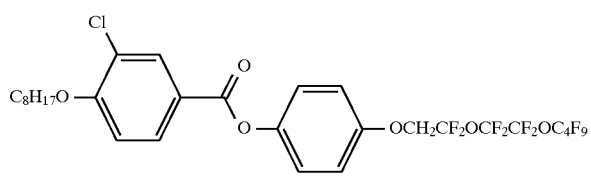
II-9
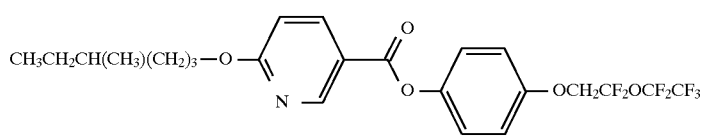
II-10
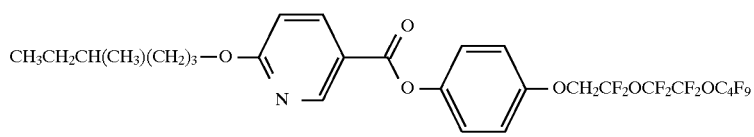
II-11
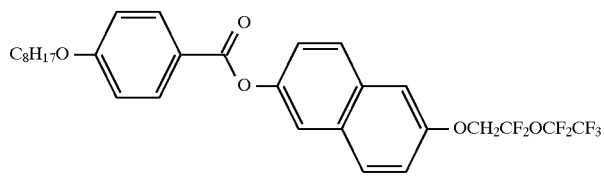
II-12
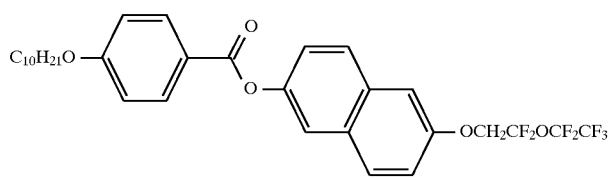
II-13
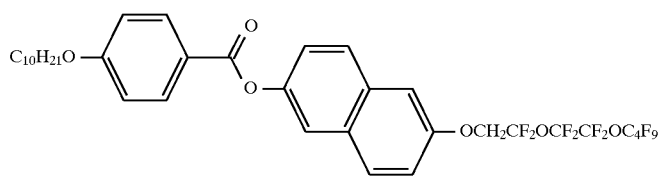
II-14
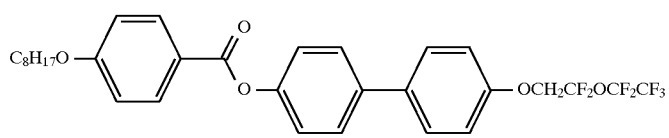
II-15

-continued
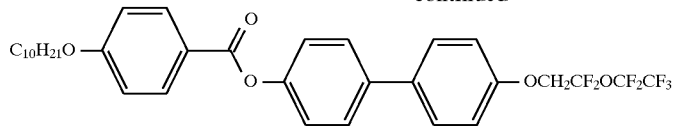
II-16
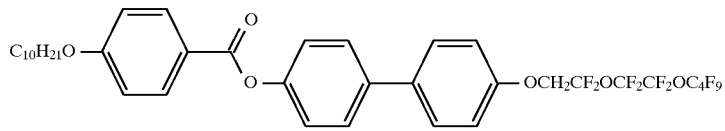
II-17
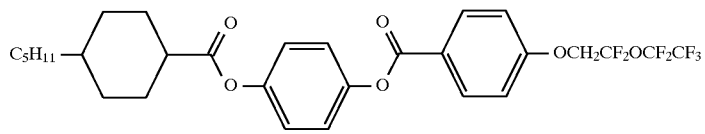
II-18
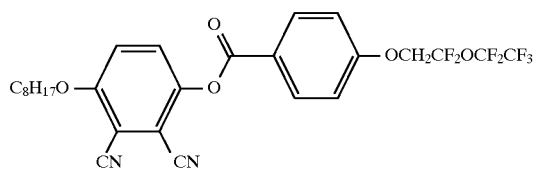
II-19
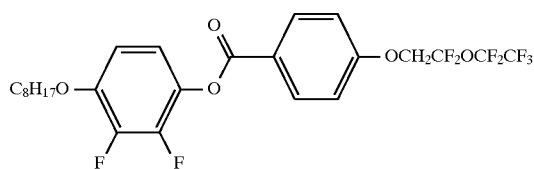
II-20
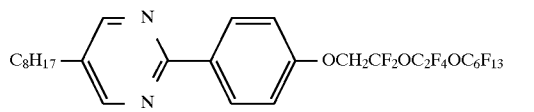
II-21
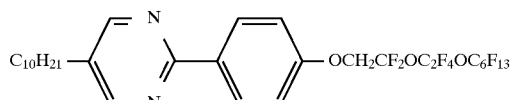
II-22
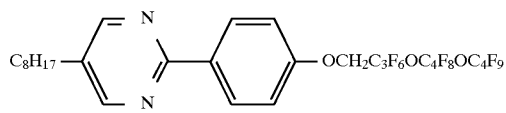
II-23
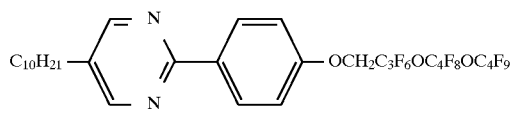
II-24
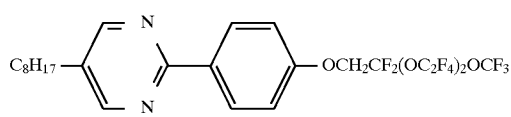
II-25
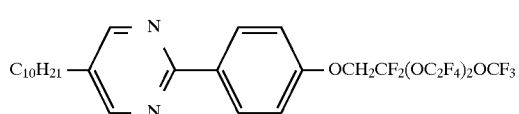
II-26
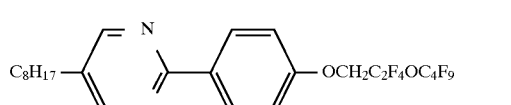
II-27

-continued
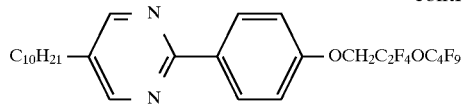 II-28
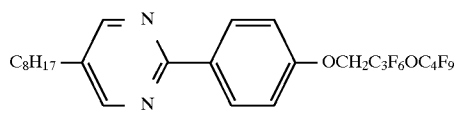 II-29
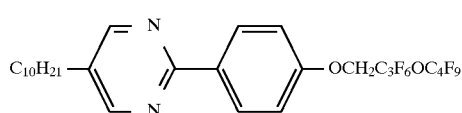 II-30
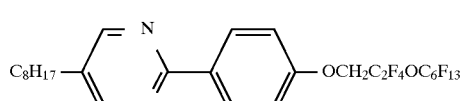 II-31
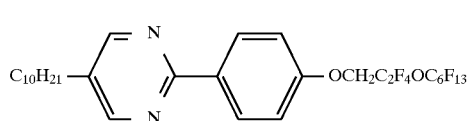 II-32
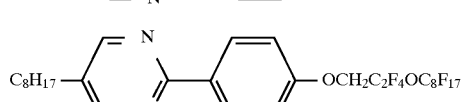 II-33
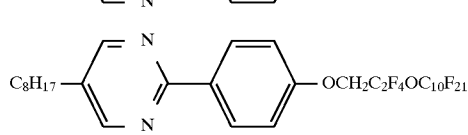 II-34
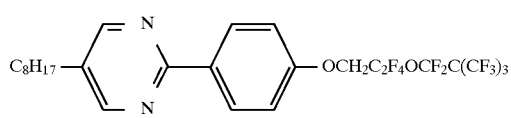 II-35
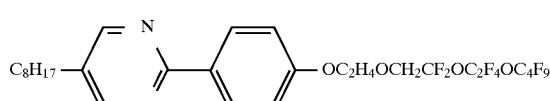 II-36
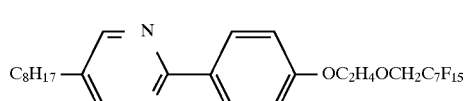 II-37
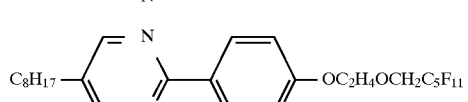 II-38
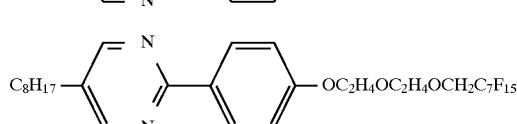 II-39
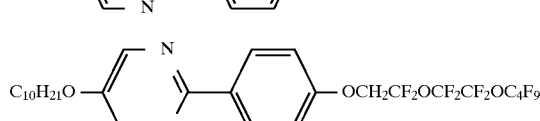 II-40
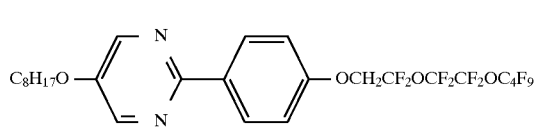 II-41

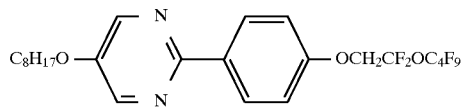

II-42

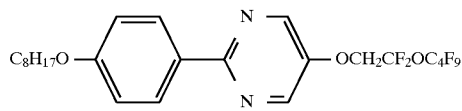

II-43

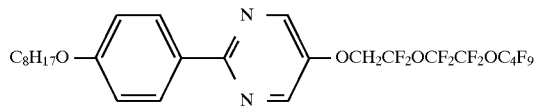

II-44

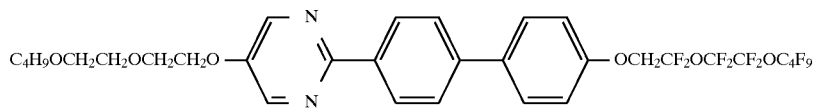

II-45

The chiral smectic liquid crystal composition used in the present invention may preferably contain at least 10 wt. % of at least one species of the first perfluoroether-type mesomorphic compound, at least 10 wt. % of at least one species of the second perfluoroether-type mesomorphic compound, and at least 10 wt. % of at least one species of the third perfluoroether-type mesomorphic compound for the purpose of attaining good drive characteristics, a high reliability and a good drive stability in a broad temperature range. In order to further improve a contrast ratio and response speed by using such a chiral smectic liquid crystal composition, the chiral smectic liquid crystal composition may preferably assume a bookshelf structure or a structure closer thereto having a small layer inclination angle. For this purpose, the first to third perfluoroether-type mesomorphic compound may more preferably be contained in a total amount of at least 30 wt. %, particularly 50 wt. %, per (100 wt. % of) the chiral smectic liquid crystal composition.

The chiral smectic liquid crystal composition may further contain at least one species of another mesomorphic compound in an appropriate amount, generally at most 50 wt. %, as desired, and at least one species of an optically active compound in an appropriate amount, generally 0.5–50 wt. %, as desired.

Examples of another mesomorphic compound may include a fluorine-containing mesomorphic compound having a perfluoroalkyl group (hereinafter, called "perfluoroalkyl-type mesomorphic compound) in view of a high mutual solubility with the first to third perfluoroether-type mesomorphic compounds and may include a hydrocarbon-type mesomorphic compound free from a perfluorocarbon chain (e.g., perfluoroether group or perfluoroalkyl group).

The perfluoroalkyl-type mesomorphic compound as another mesomorphic compound may include compounds described in, e.g., JP-A 2-142753.

The perfluoroalkyl-type mesomorphic compound may preferably comprise a fluorocarbon terminal portion represented by the formula —D$^1$—C$_{xa}$F$_{2xa}$—X, where xa is 1–20; X is —H or —F; —D$^1$— is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO— where ra and rb are independently 1–20; and pa is 0–4.

The perfluoroalkyl-type mesomorphic compound may more preferably be represented by the following general formula (I):

Formula (I):

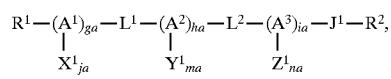

wherein A$^1$, A$^2$ and A$^3$ are each independently

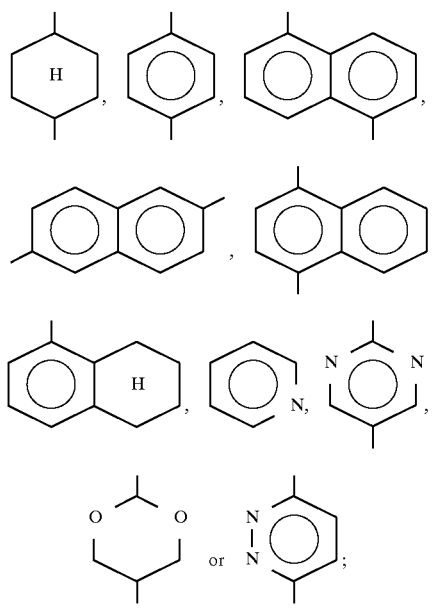

ga, ha and ia are independently an integer of 0–3 with the proviso that the sume of ga+ha+ia be at least 2;

L$^1$ and L$^2$ are independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

X$^1$, Y$^1$ and Z$^1$ are each a substituent of A$^1$, A$^2$ and A$^3$, respectively, and each X$^1$, Y$^1$ and Z$^1$ are independently —H, —Cl, —F, —Br, —I, —OH, —OCH$_3$, —CH$_3$, —CN or —NO$_2$;

each ja, ma and na are independently an integer of 0–4;
J$^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO— where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}R^3$, —O—$C_{qa}H_{2qa}$—$R^3$, —CO—O—$C_{qa}H_{2qa}$—$R^3$, or —O—CO—$C_{qa}H_{2qa}$—$R^3$ which may be either straight chain or branched where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, wherein X is —H or —F, xa is an integer of 1–20.

The perfluoroalkyl-type mesomorphic compound represented by the formula (I) may be synthesized through processes similar to those descried in JP-A (Kokai) 2-142753 and U.S. Pat. No. 5,082,587. Specific examples of such a mesomorphic compound of the formula (I) may include those (Example Compound Nos. I-1 to I-103) shown below.

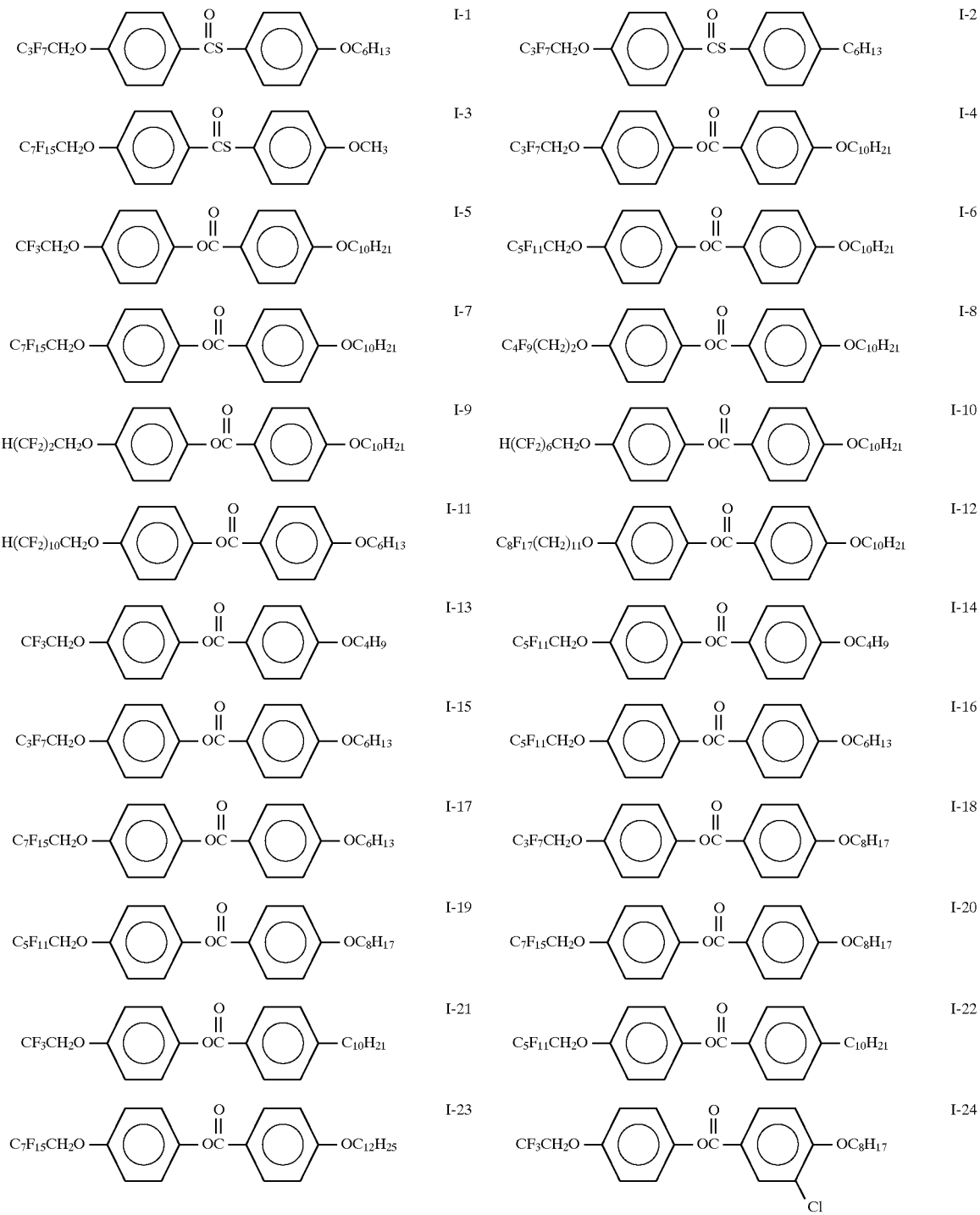

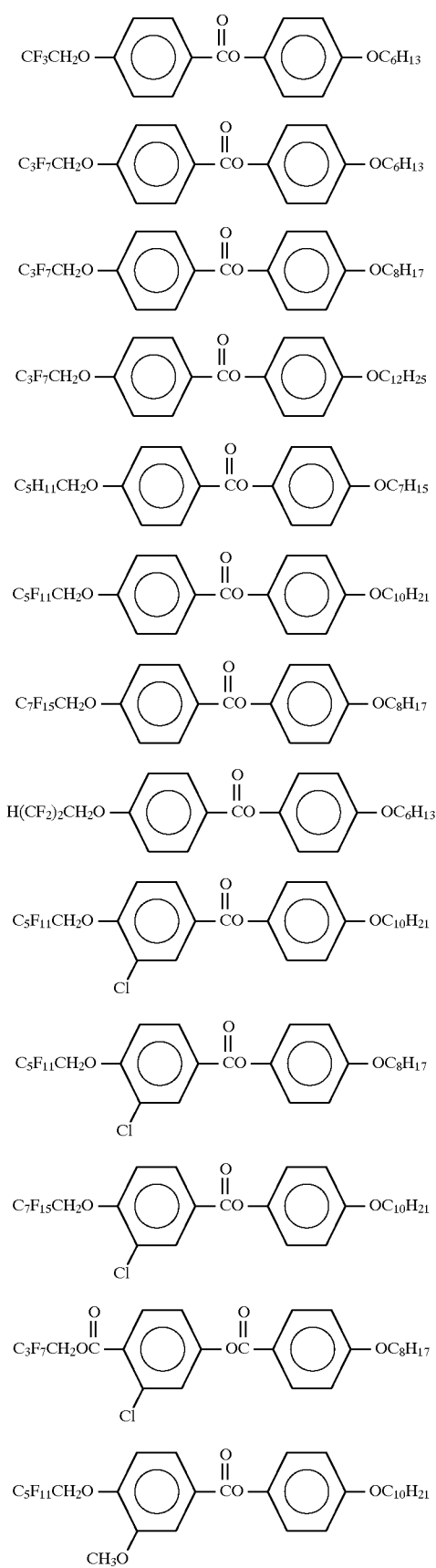
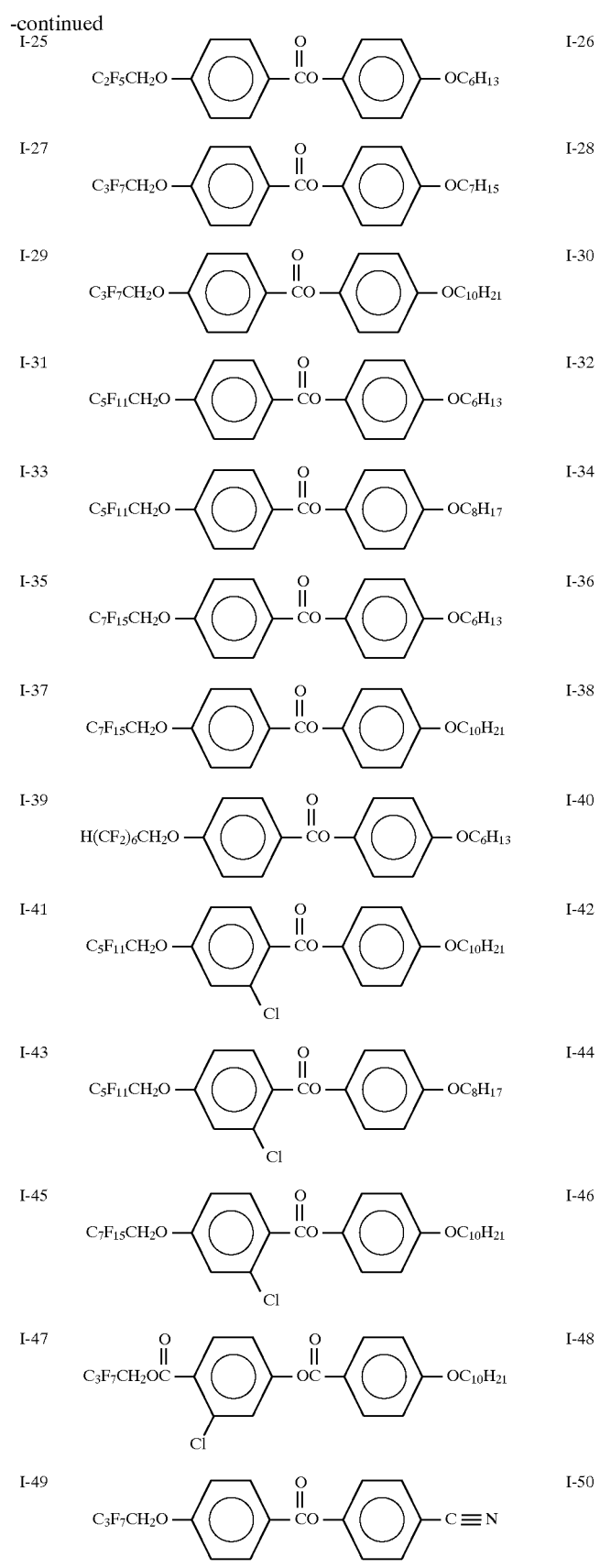

-continued
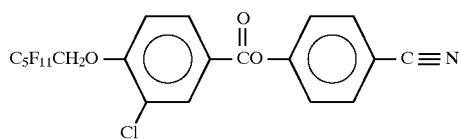 I-51
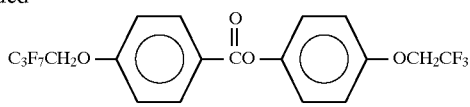 I-52
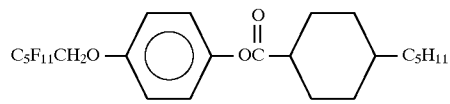 I-53
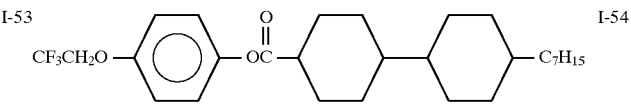 I-54
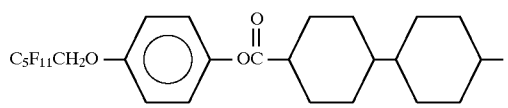 I-55
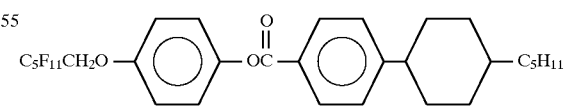 I-56
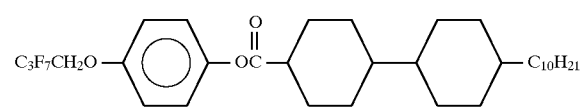 I-57
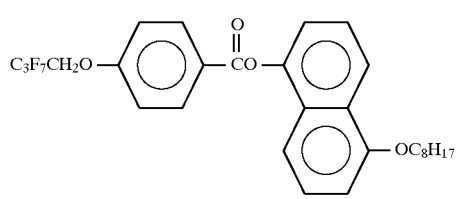 I-58
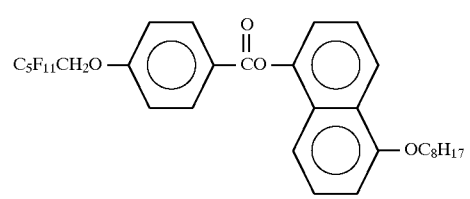 I-59
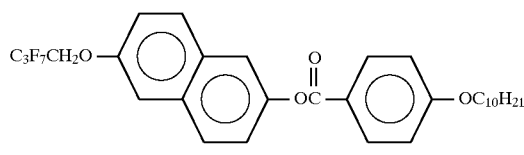 I-60
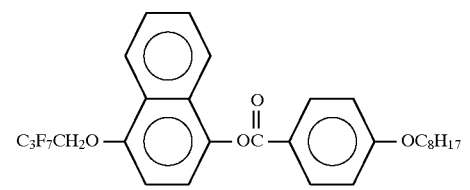 I-61
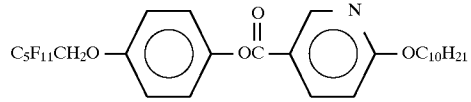 I-62
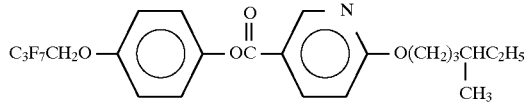 I-63
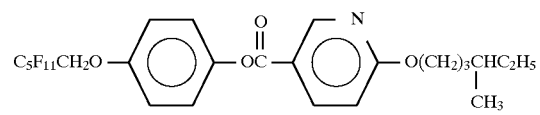 I-64
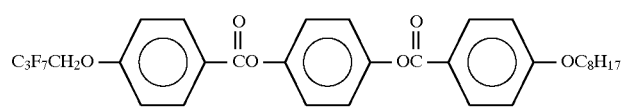 I-65
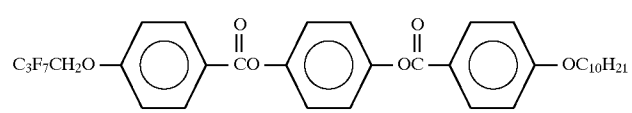 I-66
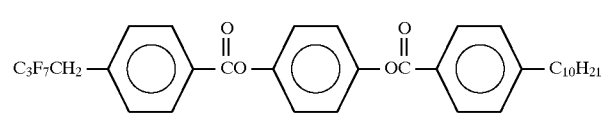 I-67
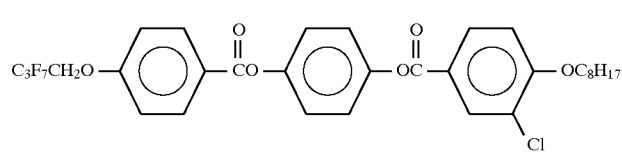 I-68

-continued
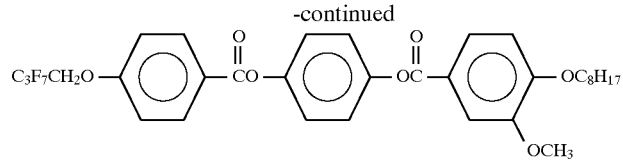
I-69
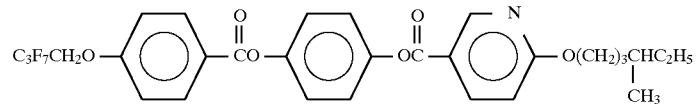
I-70
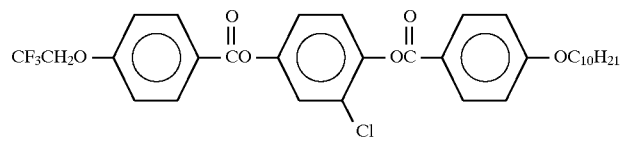
I-71
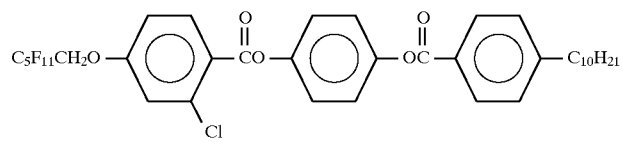
I-72
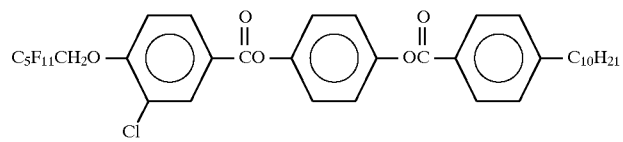
I-73
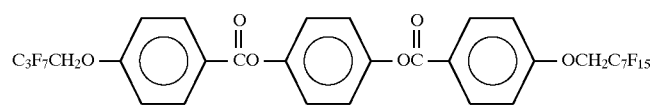
I-74
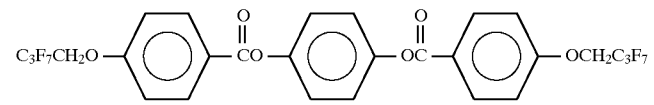
I-75
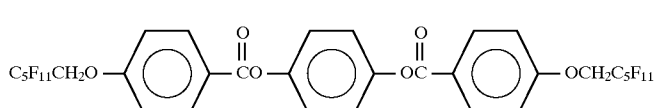
I-76
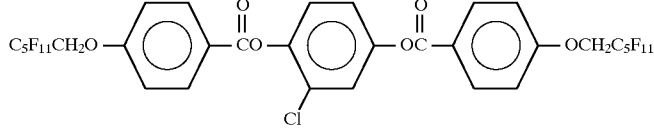
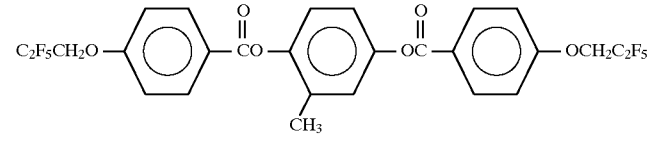
I-77
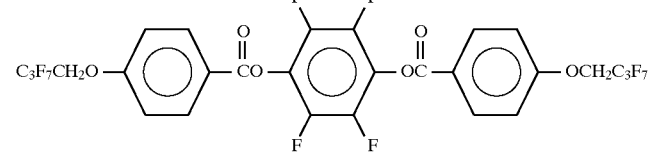
I-78
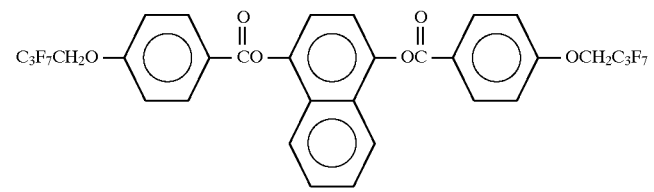
I-79

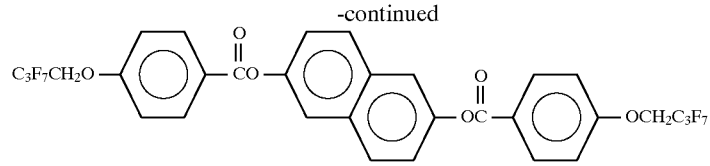
I-80
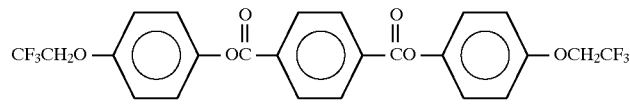
I-81
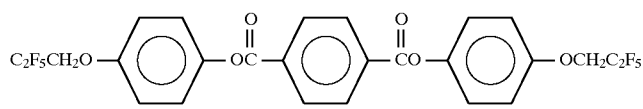
I-82
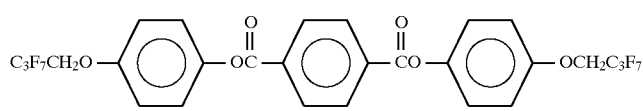
I-83
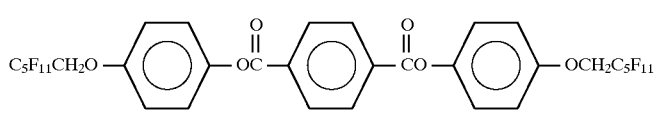
I-84
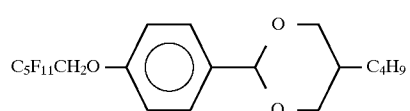
I-85
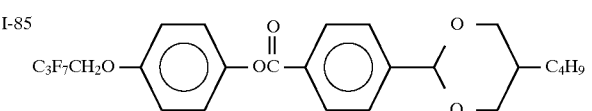
I-86
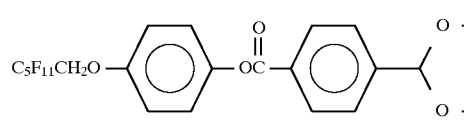
I-87
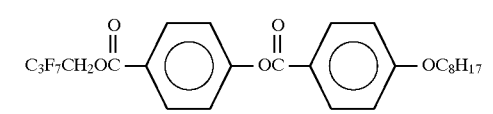
I-88
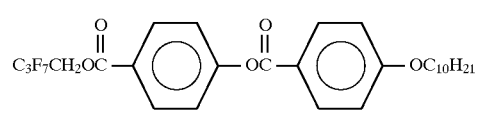
I-89
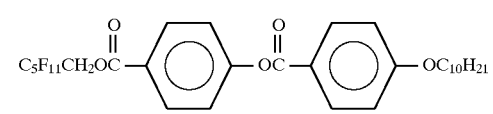
I-90
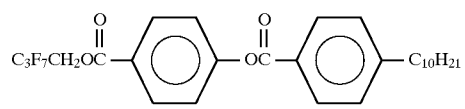
I-91
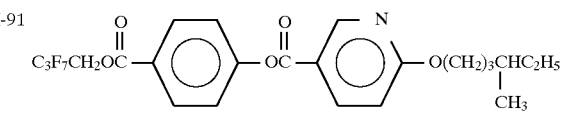
I-92
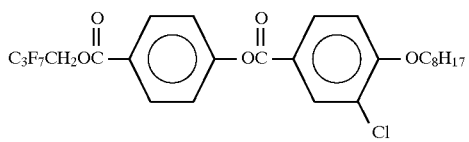
I-93
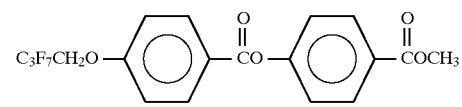
I-94
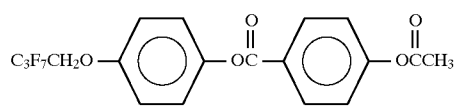
I-95
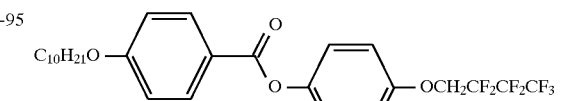
I-96
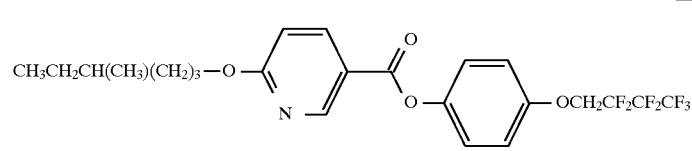
I-97
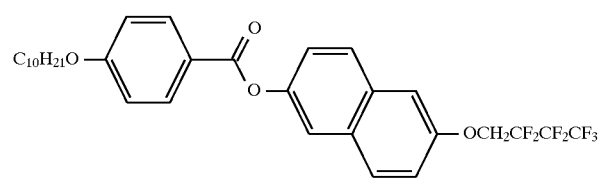
I-98

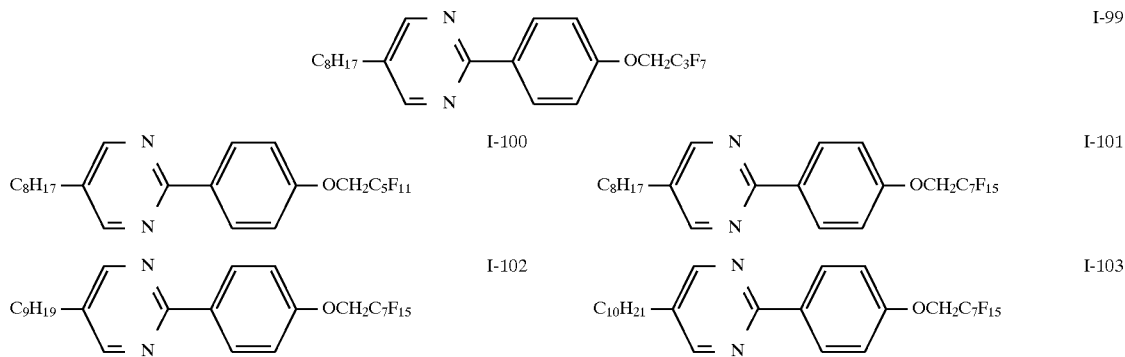
Specific examples of the hydrocarbon-type mesomorphic compound (free from a perfluorocarbon chain) as another mesomorphic compound may include those shown below.
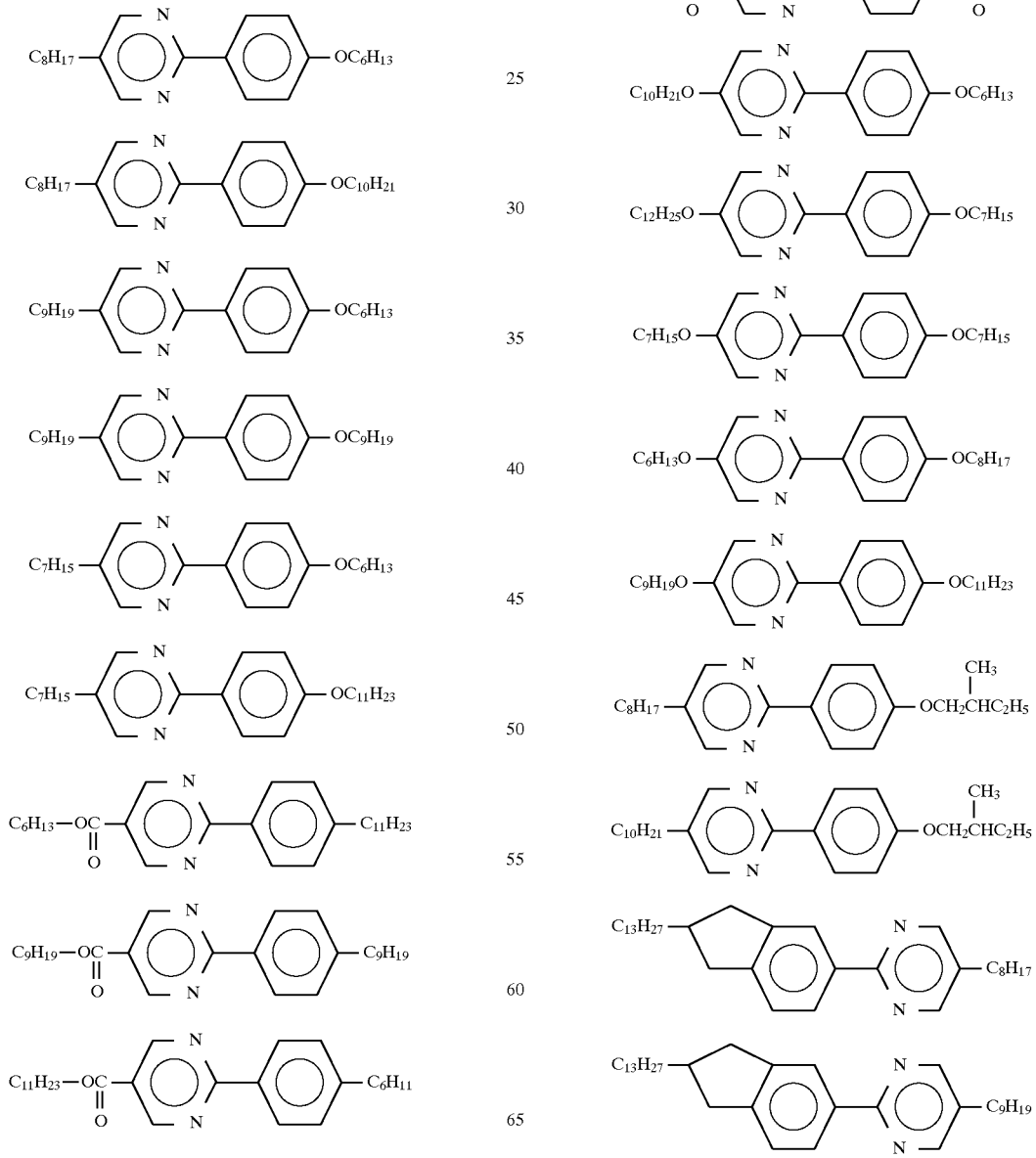

-continued

-continued
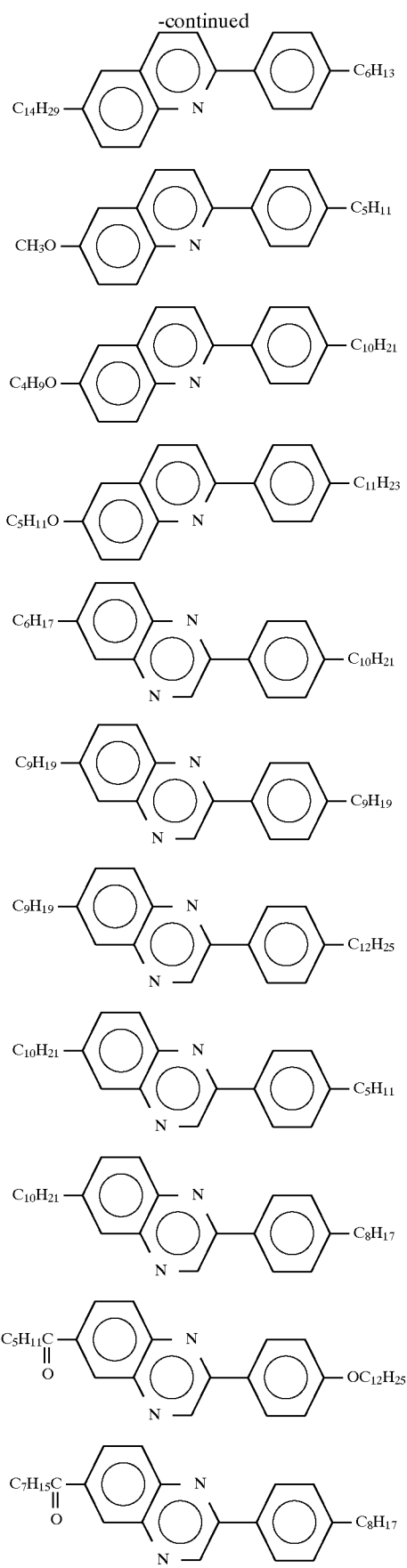
-continued
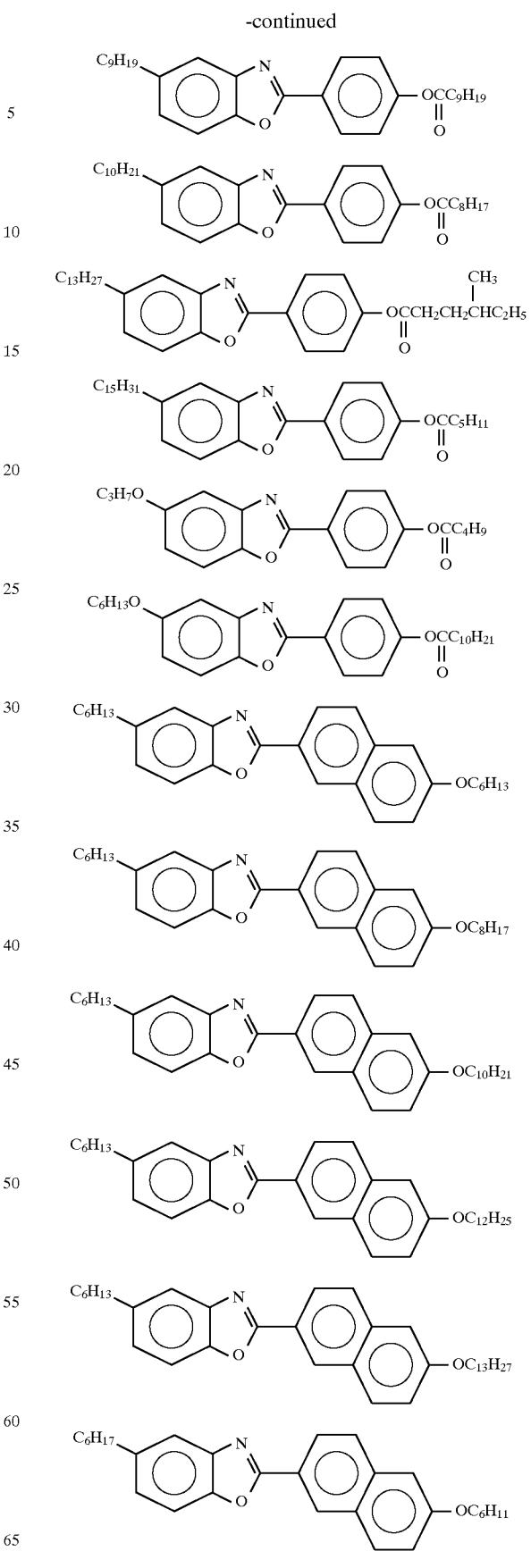

37
-continued
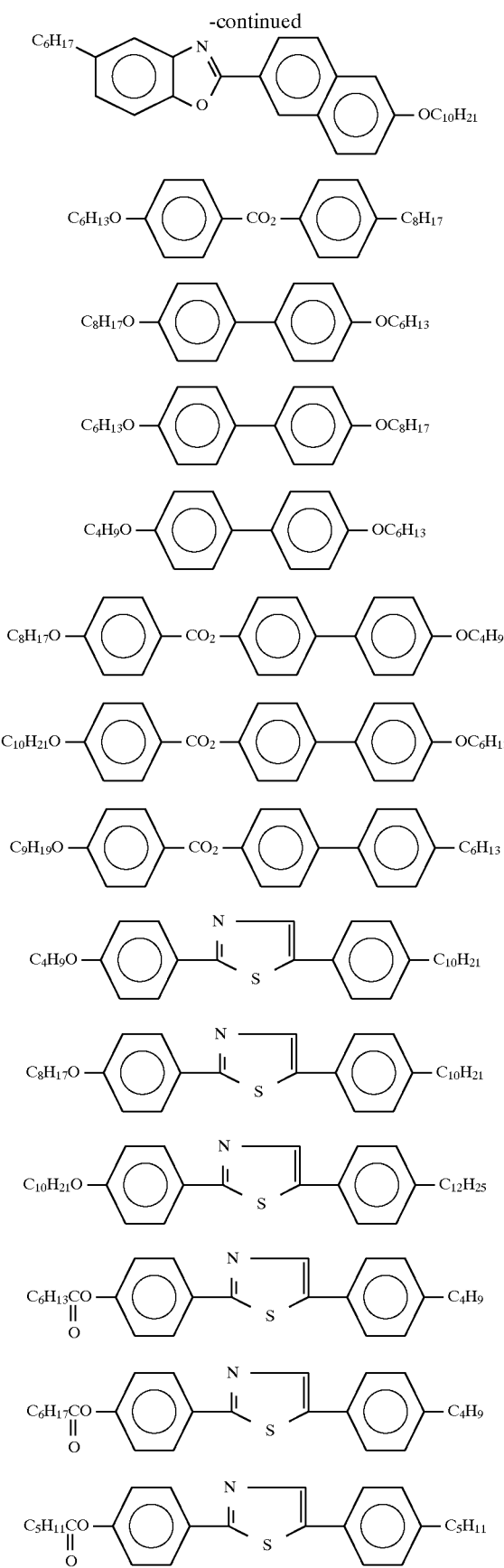
38
-continued
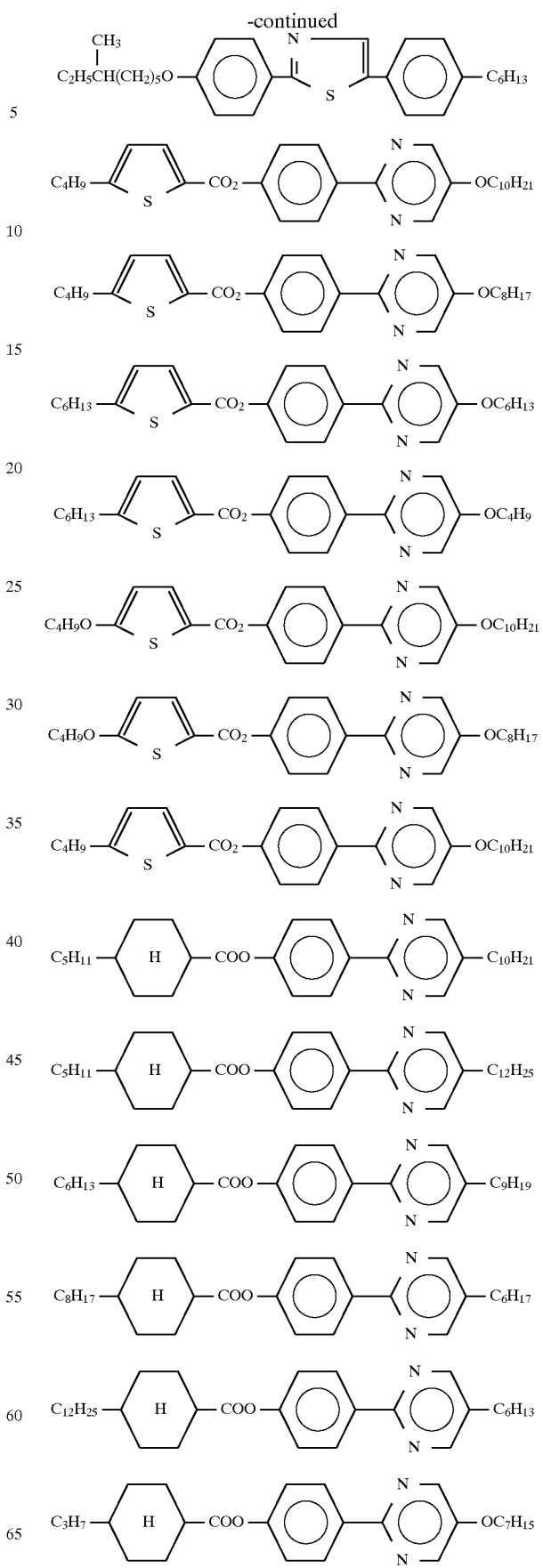

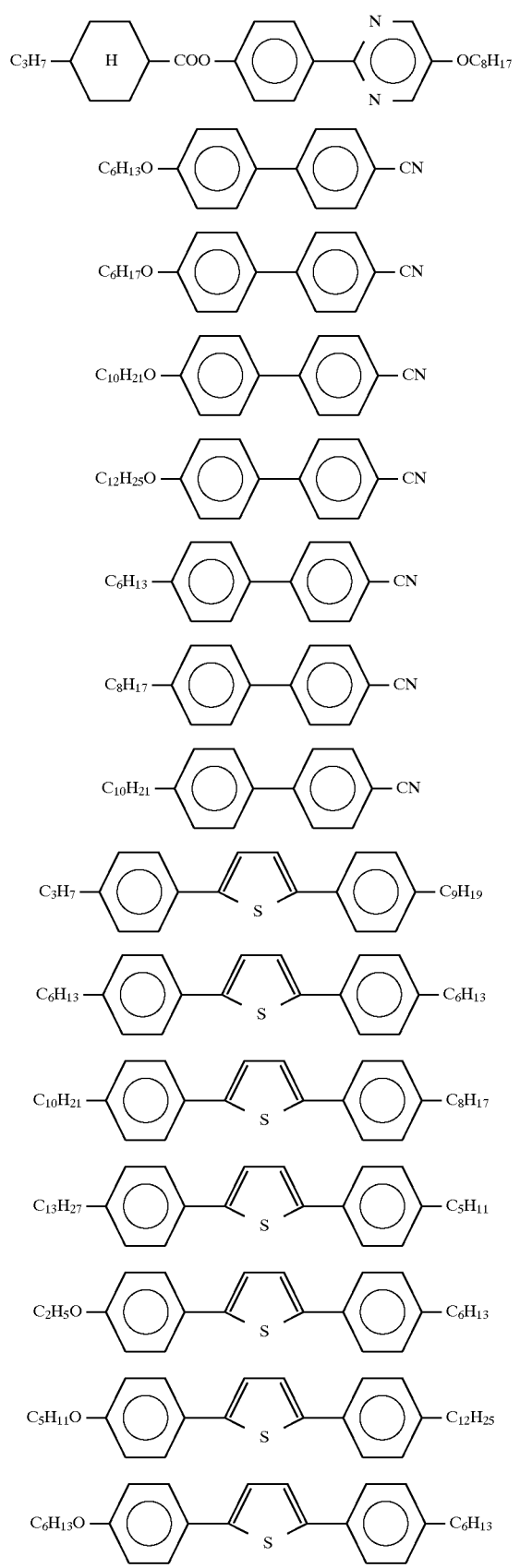
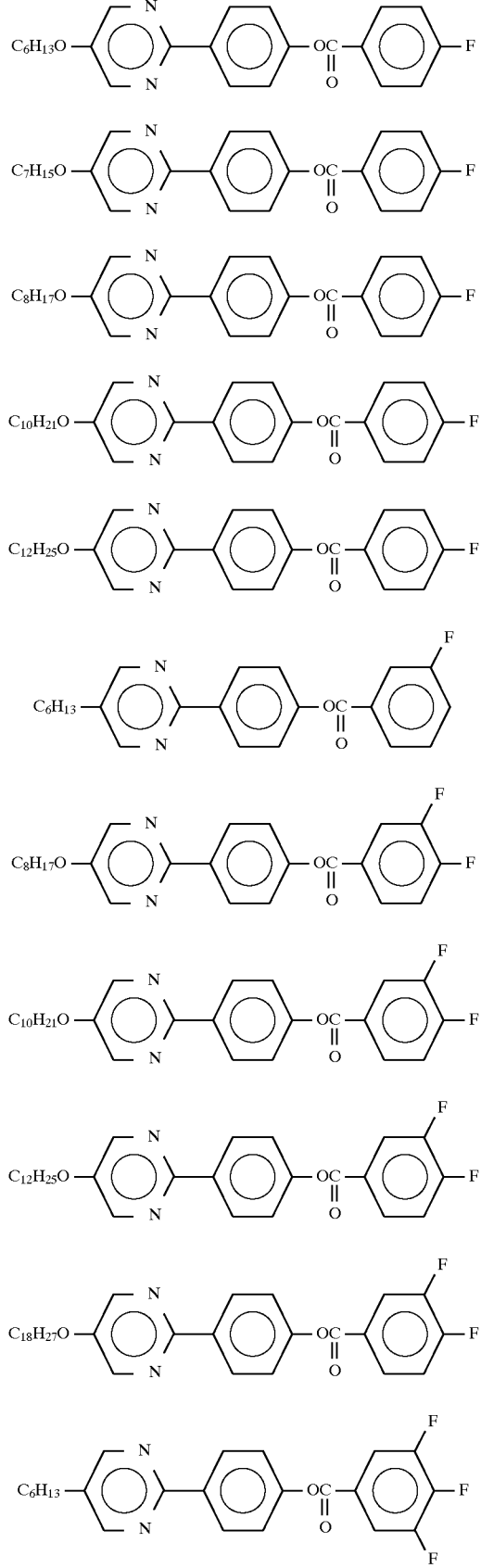

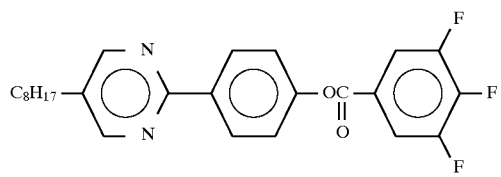

5

Specific examples of the optically active compound may preferably include those shown below.

TABLE A (for Compounds Nos. A-1 to A-105)
$R^{6''}—A^{6''}—X^{6''}—A^{7''}—A^{8''}—X^{7''}—R^{7''}—\Sigma^{**}—R^{9''}$

| No. | $R^{6''}$ | $A^{6''}$ | $X^{6''}$ | $A^{7''}$ | $A^{8''}$ | $X^{7''}$ | $R^{7''}$ | $\Sigma^{**}$ | $R^{8''}$ | $R^{9''}$ |
|---|---|---|---|---|---|---|---|---|---|---|
| 1 | $C_6H_{13}$ | — | — | Ph | Ph | — | M1 | Σ | H | $C_8H_{17}$ |
| 2 | $C_8H_{17}O$ | — | — | Ph | Ph | — | M1 | Σ | H | $C_{18}H_{37}$ |
| 3 | $C_6H_{11}O$ | — | — | Ph | Ph2F | — | M1 | Σ | H | $C_6H_{13}$ |
| 4 | $CH_3O$ | — | — | Ph | Ph | — | M1 | Σ | H | $C_6H_{13}$ |
| 5 | $C_6H_{13}CH(CH_3(CH_2)_2O$ | — | — | Ph | Ph | — | M1 | Σ | H | $C_6H_{13}$ |
| 6 | $C_7H_{15}O$ | — | — | Ph | P23F | — | M1 | Σ | H | $C_6H_{13}$ |
| 7 | $C_6H_{13}$ | — | — | Ph | Ph | — | M1 | Σ | H | $C_9H_{19}$ |
| 8 | $C_7H_{15}O$ | — | — | Ph | Ph | — | M1 | Σ | H | $C_5H_{11}$ |
| 9 | $C_8H_{17}O$ | — | — | Ph | Ph | — | M1 | Σ | H | $C_6H_{13}$ |
| 10 | $C_8H_{17}$ | — | — | Pr1 | Ph | — | M1 | Σ | H | $C_8H_{17}$ |
| 11 | $C_{10}H_{21}$ | — | — | Pr2 | Ph | — | M1 | Σ | H | $C_4H_9$ |
| 12 | $C_{11}H_{23}$ | — | — | Pr2 | Ph | — | M1 | Σ | H | $C_6H_{13}$ |
| 13 | $C_{12}H_{25}$ | — | — | Pr2 | Ph | — | M1 | Σ | H | $C_8H_{17}$ |
| 14 | $C_4H_9O$ | — | — | Py1 | Ph | — | ML | Σ | H | $C_{10}H_{21}$ |
| 15 | $C_{13}H_{27}$ | — | — | Py2 | Ph | — | M1 | Σ | H | $C_5H_{11}$ |
| 16 | $C_6H_{13}$ | — | — | Py2 | Ph | — | M1 | Σ | H | $C_8H_{17}$ |
| 17 | $C_6H_{13}CH(CH_3)CH_2O$ | — | — | Py2 | Ph | — | M1 | Σ | H | $C_9H_{19}$ |
| 18 | $C_5H_{11}O$ | — | — | Py2 | P23F | — | M1 | Σ | H | $C_4H_9$ |
| 19 | $C_{10}H_{21}$ | — | — | Py2 | Ph | — | M1 | Σ | H | $C_6H_{13}$ |
| 20 | $C_8H_{17}$ | — | — | Py2 | Ph3F | — | M1 | Σ | H | $C_8H_{17}$ |
| 21 | $C_6H_{13}$ | — | — | Cy | Ph | — | M1 | Σ | H | $C_4H_9$ |
| 22 | $C_3H_7$ | — | — | Cy | Ph | — | M1 | Σ | H | $C_5H_{11}$ |
| 23 | $C_5H_{11}$ | — | — | Cy | Ph | — | M1 | Σ | H | $C_{14}H_{29}$ |
| 24 | $C_{10}H_{12}$ | — | — | Cy | Ph | — | M1 | Σ | H | $C_{10}H_{21}$ |
| 25 | $C_6H_{13}$ | — | — | Pa | Ph | — | M1 | Σ | H | $C_{10}H_{21}$ |
| 26 | $C_7H_{15}OCO$ | — | — | Pd | Ph | — | M1 | Σ | H | $C_3H_7$ |
| 27 | $C_6H_{13}$ | — | — | Dt2 | Ph | — | M1 | Σ | H | $C_6H_{13}$ |
| 28 | $C_8H_{17}$ | — | — | Tn | Ph | — | M1 | Σ | H | $C_9H_{19}$ |
| 29 | $C_5H_{11}$ | — | — | Tz1 | Ph | — | M1 | Σ | H | $C_9H_{19}$ |
| 30 | $C_9H_{19}O$ | — | — | Tz2 | Ph | — | M1 | Σ | H | $C_6H_{13}$ |
| 31 | $C_2H_5$ | — | — | Td | Ph | — | M1 | Σ | H | $C_7H_{16}$ |
| 32 | $C_{10}H_{21}$ | — | — | Dx2 | Ph | — | M1 | Σ | H | $C_8H_{17}$ |
| 33 | $C_6H_{13}$ | — | — | Boa2 | Ph | — | M1 | Σ | H | $C_{10}H_{21}$ |
| 34 | $C_{15}H_{31}$ | — | — | Bob2 | Ph | — | M1 | Σ | H | $C_{10}H_{21}$ |
| 35 | $C_7H_{15}$ | — | — | Bta2 | Ph | — | M1 | Σ | H | $C_6H_{13}$ |
| 35 | $C_{16}H_{33}O$ | — | — | Btb2 | Ph | — | M1 | Σ | H | $C_9H_{19}$ |
| 37 | $C_6H_{13}$ | — | — | Np | Ph | — | M1 | Σ | H | $C_6H_{13}$ |
| 38 | $C_5H_{11}$ | — | — | Np | Ph | — | Cb | Σ | H | $C_4H_9$ |
| 39 | $C_8H_{17}CH(CH_3)CH_2O$ | — | — | Ep1 | Ph | — | Cb | Σ | H | $C_6H_{13}$ |
| 40 | $C_4H_9$ | — | — | Ep2 | Ph | — | M1 | Σ | H | $C_8H_{17}$ |
| 41 | $C_6H_{13}$ | — | — | Gp1 | Ph | — | M1 | Σ | H | $C_6H_{13}$ |
| 42 | $C_7H_{15}$ | — | — | Gp2 | Ph | — | M1 | Σ | H | $C_{12}H_{25}$ |
| 43 | $C_6H_{13}$ | — | — | Cm1 | Ph | — | M1 | Σ | H | $C_{10}H_{21}$ |
| 44 | $C_8H_{17}$ | — | — | Io1 | Ph | — | M1 | Σ | H | $C_{12}H_{25}$ |
| 45 | $C_{18}H_{37}$ | — | — | Id1 | Ph | M1 | M1 | Σ | H | $C_6H_{13}$ |
| 46 | $C_{11}H_{23}$ | — | — | Id1 | Ph | — | M1 | Σ | H | $C_5H_{11}$ |
| 47 | $C_8H_{17}$ | — | — | Id1 | Ph | — | M1 | Σ | H | $C_5H_{11}$ |
| 48 | $C_5H_{11}$ | — | — | Id1 | Ph2F | — | M1 | Σ | H | $C_6H_{13}$ |
| 49 | $C_6H_{13}$ | — | — | Tn | Ph | — | M1 | Σ | H | $C_6H_{13}$ |
| 50 | $C_4H_9O$ | — | — | Tz2 | Ph | — | M1 | Σ | H | $C_8H_{17}$ |
| 51 | $C_{12}H_{25}$ | — | — | Btb2 | Ph | — | M1 | Σ | H | $C_{10}H_{21}$ |
| 52 | $C_6H_{13}O$ | — | — | Btb2 | Ph | — | M1 | Σ | H | $C_6H_{13}$ |
| 53 | $CH_2=CH(CH_2)_3O$ | — | — | Ep2 | Ph | — | M1 | Σ | H | $C_5H_{11}$ |
| 54 | $C_9H_{19}$ | — | — | Gp2 | Ph | — | M1 | Σ | H | $C_6H_{13}$ |
| 55 | $C_5H_{11}$ | — | — | Np | Ph | — | M1 | Σ | H | $C_6H_{13}$ |
| 56 | $C_6H_{13}$ | Ph | — | Ph | Ph | Cb | M1 | Σ | H | $C_6H_{13}$ |
| 57 | $C_8H_{17}COO$ | Pr2 | — | Ph | Ph | — | M1 | Σ | H | $C_5H_{11}$ |
| 58 | $C_3H_7$ | Py2 | — | Ph | Ph | — | M1 | Σ | H | $C_4H_9$ |
| 59 | $C_5H_{11}$ | — | — | Ha2 | Ph | — | M1 | Σ | H | $C_4H_9$ |
| 60 | $C_6H_{13}$ | Ph | COO | Pr2 | Ph | — | M1 | Σ | H | $C_6H_{13}$ |

TABLE A-continued (for Compounds Nos. A-1 to A-105)
$R^{6''}$—$A^{6''}$—$X^{6''}$—$A^{7''}$—$A^{8''}$—$X^{7''}$—$R^{7''}$—$\Sigma^{**}$—$R^{9''}$

| No. | $R^{6''}$ | $A^{6''}$ | $X^{6''}$ | $A^{7''}$ | $A^{8''}$ | $X^{7''}$ | $R^{7''}$ | $\Sigma^{**}$ | $R^{8''}$ | $R^{9''}$ |
|---|---|---|---|---|---|---|---|---|---|---|
| 61 | $C_9H_{19}$ | Ph | — | Pr1 | Ph | — | Cb | Σ | H | $C_6H_{13}$ |
| 62 | $C_{13}H_{27}$ | Ph | — | Cy | P3Br | M1 | Cb | Σ | H | $C_5H_{11}$ |
| 63 | $C_{10}H_{21}O$ | Ph | OCO | Py1 | Ph | — | M1 | Σ | H | $C_6H_{13}$ |
| 64 | $C_7H_{15}$ | Ph | — | Py2 | Ph | — | M1 | Σ | H | $C_5H_{11}$ |
| 65 | $C_4H_9$ | Ph3TF | COO | Pa | Ph | — | M1 | Σ | H | $C_6H_{13}$ |
| 66 | $CH_3$ | — | — | Hb2 | Ph | — | M1 | Σ | H | $C_8H_{17}$ |
| 67 | $C_8H_{17}$ | Ph | — | Tn | Ph | — | M1 | Σ | H | $(CH_2)_3CH(CH_3)_2$ |
| 68 | $C_2H_5$ | Ph | — | Tz1 | Ph2M | — | M1 | Σ | H | $C_8H_{17}$ |
| 69 | $C_6H_{13}$ | Ph | — | Ph | Ph | — | M1 | Σ | H | $C_8H_{17}$ |
| 70 | $C_{10}H_{21}$ | Ph | — | Td | Ph | — | M1 | Σ | H | $(CH_2)_3CH(CH_3)_2$ |
| 71 | $C_{10}H_{21}$ | — | — | Ph | Py1 | — | M1 | Σ | H | $C_6H_{13}$ |
| 72 | $C_6H_{13}$ | — | — | Ph | Py1 | — | M1 | Σ | H | $C_4H_9$ |
| 73 | $C_6H_{13}OCO$ | — | — | Ph | Py1 | — | M1 | Σ | H | $C_6H_{13}$ |
| 74 | $C_7H_{15}$ | — | — | Ph | Pr2 | — | M1 | Σ | H | $C_5H_{11}$ |
| 75 | $C_9H_{19}$ | — | — | Ph | Pr2 | — | M1 | Σ | H | $(CH_2)_3CH(CH_3)_2$ |
| 76 | $C_7H_{15}$ | — | — | Ph | Pr2 | — | M1 | Σ | H | $C_6H_{13}$ |
| 77 | $C_5H_{11}O$ | — | — | Py2 | Cy | — | M1 | Σ | H | $C_{10}H_{21}$ |
| 78 | $C_4H_9$ | — | — | Ph | Cy | — | M1 | Σ | H | $C_{12}H_{25}$ |
| 79 | $C_{12}H_{25}$ | — | — | Ph | Cy | — | M1 | Σ | H | $C_5H_{11}$ |
| 80 | $C_6H_{13}C\equiv C$ | — | — | Ph | Pa | — | M1 | Σ | H | $C_{10}H_{21}$ |
| 81 | $C_8H_{17}O$ | — | — | Ph | Pd | — | M1 | Σ | My | $C_5H_{13}$ |
| 82 | $C_3H_7$ | — | — | P2Cl | Tn | — | M1 | Σ | H | $C_{10}H_{21}$ |
| 83 | $C_4H_9$ | — | — | Ph | Tn | — | M1 | Σ | H | $C_8H_{17}$ |
| 84 | $C_8H_{17}$ | — | — | Ph | Tz1 | — | M1 | Σ | H | $C_8H_{17}$ |
| 85 | $C_4H_9OCH(CH_3)COO$ | — | — | Ph | Tz1 | — | M1 | Σ | H | $C_7H_{15}$ |
| 86 | $C_6H_{13}$ | — | — | Ph2F | Td | — | M1 | Σ | My | $(CH_2)_3CH(CH_3)C_6H_{13}$ |
| 87 | $C_5H_{11}$ | — | — | Py2 | Np | — | M1 | Σ | H | $C_9H_{19}$ |
| 88 | $CH_3$ | — | — | Ph | Np | — | M1 | Σ | H | $C_{12}H_{25}$ |
| 89 | $C_{11}H_{23}$ | — | — | Ph | Np | — | M1 | Σ | H | $C_6H_{13}$ |
| 90 | $C_5H_{11}$ | — | — | Py1 | Ep1 | — | M1 | Σ | H | $C_5H_{11}$ |
| 91 | $C_8H_{17}OC_2H_4$ | — | — | Ph | Ep1 | — | M1 | Σ | H | $C_5H_{11}$ |
| 92 | $C_6H_{13}$ | — | — | Ph | Ep1 | — | M1 | Σ | H | $C_8H_{17}$ |
| 93 | $C_9H_{19}$ | — | — | Py1 | Gp1 | — | M1 | Σ | H | $C_5H_{11}$ |
| 94 | $C_8H_{17}$ | — | — | Ph | Gp1 | — | M1 | Σ | H | $C_6H_{13}$ |
| 95 | $C_3H_7COO$ | — | — | Ph | Gp1 | — | M1 | Σ | H | $C_8H_{17}$ |
| 96 | $C_4H_9$ | — | — | Ph | Id1 | — | M1 | Σ | U | $C_8H_{17}$ |
| 97 | $C_{12}H_{25}$ | — | — | Ph | Io1 | Cb | M1 | Σ | H | $C_6H_{13}$ |
| 98 | $C_{10}H_{21}$ | — | — | Ph | Cm1 | — | M1 | Σ | H | $C_8H_{17}$ |
| 99 | $C_6H_{13}$ | — | — | Ph | Ph | — | M1 | Σ | H | $C_8H_{17}$ |
| 100 | $C_3H_7$ | Ph | $OCH_2$ | Ph | Py1 | — | M1 | Σ | H | $C_{12}H_{25}$ |
| 101 | $C_4H_9$ | Ph2CN | — | Ph | Pr1 | — | M1 | Σ | H | $C_{10}H_{21}$ |
| 102 | $C_5H_{11}$ | Ph | $CH_2O$ | Ph3F | Tz1 | Cb | M1 | Σ | H | $C_5H_{13}$ |
| 103 | $C_6H_{13}$ | Ph | — | Ph | Tn | — | M1 | Σ | H | $C_8H_{17}$ |
| 104 | $C_7H_{15}$ | Tn | — | Ph | Py1 | — | M1 | Σ | H | $C_8H_{17}$ |
| 105 | $C_{10}H_{21}$ | Ph | — | Ph | Cy1 | — | M1 | Σ | H | $C_5H_{11}$ |

In Table A, the respective abbreviations (symbols) mean the following groups, respectively.

Ph:

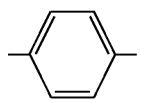

Ph2F:

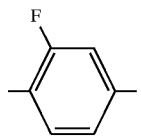

Ph3F:

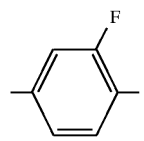

P23F:

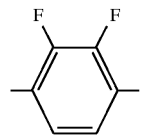

-continued
P2Cl:
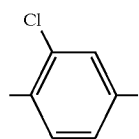
P3Br:
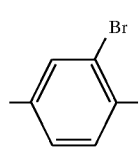
P3TF:
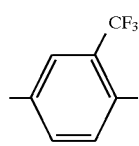
Ph2M:
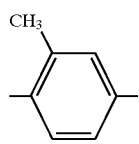
Ph2CN:
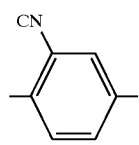
Pr1:
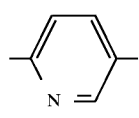
Pr2:
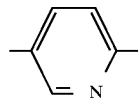
Cy:
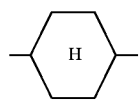
Pyl:
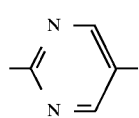
-continued
Py2:
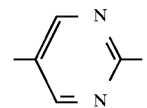
Pa:
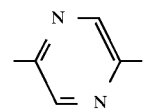
Pd:
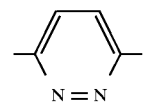
Dt2:
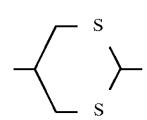
Tn:
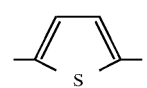
Tz1:
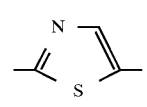
Tz2:
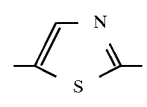
Td:
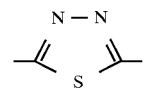
Dx2:
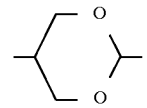
Boa2:
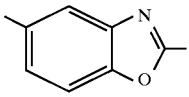
Bob2:
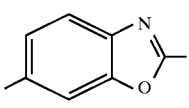

Bta2:
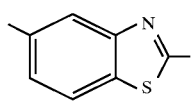
Btb2:
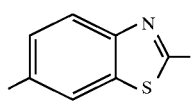
Np:
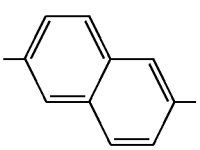
Ep1:
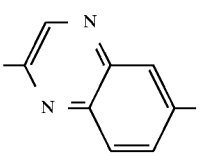
Ep2:
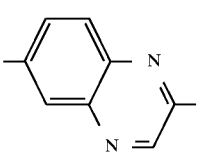
Gp1:
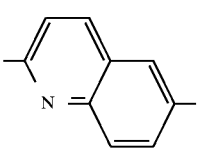
Gp2:
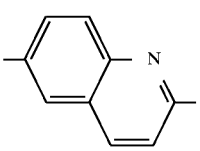
Id1:
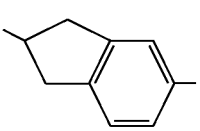
Io1:
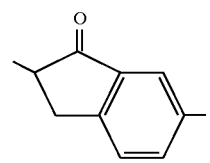
Cm1:
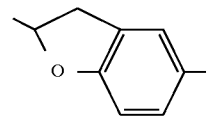
Ha2:
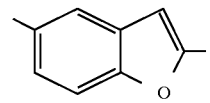
Hb2:
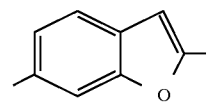
M1:
$-CH_2-$,
Cb:
$$-\overset{O}{\underset{\|}{C}}-,$$
Σ:
$$-\underset{*}{\overset{F}{\underset{|}{C}}}(R^{8\prime\prime})-,$$
My:
$-CH_3$

TABLE B (for Compounds Nos. B-1 to B-105)

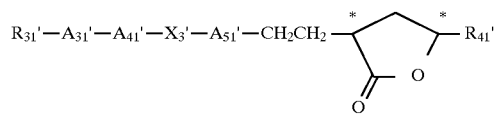

| No. | $R_{31}'$ | $A_{31}'$ | $A_{41}'$ | $X_3'$ | $A_{51}'$ | L | $R_{41}'$ |
|---|---|---|---|---|---|---|---|
| 1 | $C_6H_{13}$ | — | — | — | Ph | L | $C_6H_{17}$ |
| 2 | $C_6H_{17}O$ | — | — | — | Ph | L | $C_{18}H_{37}$ |
| 3 | $C_6H_{11}O$ | — | — | — | Ph2F | L | $C_6H_{13}$ |
| 4 | $CH_3O$ | — | Ph | — | Ph | L | $C_6H_{13}$ |
| 5 | $C_6H_{13}{}^4CHF(CH_2)_2O$ | — | Ph | — | Ph | L | $C_6H_{13}$ |
| 6 | $C_7H_{15}O$ | — | Ph | — | Ph23F | L | $C_6H_{13}$ |
| 7 | $C_6H_{13}$ | — | Ph | $-OCH_2-$ | Ph | L | $C_6H_{19}$ |
| 8 | $C_6F_{13}CH_2O$ | — | Ph | $-C\equiv C-$ | Ph | L | $C_6H_{11}$ |
| 9 | $C_6H_{17}O$ | — | Ph | $-COO-$ | Ph | L | $C_6H_{13}$ |
| 10 | $C_6H_{17}$ | — | Pr1 | — | Ph | L | $C_6H_{17}$ |
| 11 | $C_{10}H_{21}$ | — | Pr2 | — | Ph | L | $C_4H_9$ |
| 12 | $C_{11}H_{23}$ | — | Pr2 | — | Ph | L | $C_6H_{13}$ |
| 13 | $C_{12}H_{26}$ | — | Pr2 | $-COO-$ | Ph | L | $C_6H_{17}$ |
| 14 | $C_4H_9O$ | — | Py1 | — | Ph | L | $C_{10}H_{21}$ |
| 15 | $C_{13}H_{27}$ | — | Py2 | — | Ph | L | $C_6H_{11}$ |
| 16 | $C_6H_{13}O$ | — | Py2 | — | Ph | L | $C_6H_{17}$ |
| 17 | $C_6H_{13}{}^4CHFCH_2O$ | — | Py2 | — | Ph | L | $C_9H_{19}$ |
| 18 | $C_6H_{11}O$ | — | Py2 | — | Ph23F | L | $C_4H_9$ |
| 19 | $C_{10}H_{21}$ | — | Py2 | — | Ph | L | $C_6H_{13}$ |
| 20 | $C_6H_{17}$ | — | Py2 | — | Ph3F | L | $C_7H_{15}$ |
| 21 | $C_6H_{13}$ | — | Cy | — | Ph | L | $C_4H_8OC_4H_9$ |
| 22 | $C_7H_{16}OCO$ | — | Cy | — | Ph | L | $C_{14}H_{29}$ |
| 23 | $C_6H_{13}$ | — | Cy | $-CH=CH-$ | Ph | L | $C_{10}H_{21}$ |
| 24 | $C_3H_7$ | — | Cy | $-COO-$ | Ph | L | $C_6H_{13}$ |
| 25 | $C_5H_{11}$ | — | Pa | — | Ph | L | $C_6H_{17}$ |
| 26 | $C_{10}H_{21}$ | — | Pd | — | Ph | L | $C_6H_{13}$ |
| 27 | $C_6H_{13}$ | — | Dt2 | — | Ph | L | $(CH_2)_7CH=CH_2$ |
| 28 | $C_8H_{17}$ | — | Tn | — | Ph | L | $C_9H_{19}$ |
| 30 | $C_5H_{11}$ | — | Tz1 | — | Ph | L | $C_6H_{17}$ |
| 31 | $C_9H_{19}O$ | — | Tz2 | — | Ph | L | $C_5H_{12}$ |
| 32 | $C_2H_5$ | — | Td | — | Ph | L | $C_6H_{17}$ |
| 33 | $C_{10}H_{21}$ | — | Dx2 | — | Ph | L | $C_7H_{15}$ |
| 34 | $C_6H_{13}$ | — | Boa2 | — | Ph | L | $C_{10}H_{21}$ |
| 35 | $C_7H_{15}$ | — | Bob2 | — | Ph | L | $C_6H_{13}$ |
| 36 | $C_{16}H_{33}O$ | — | Bta2 | — | Ph | L | $C_6H_{13}$ |
| 37 | $C_6H_{13}$ | — | Btb2 | — | Ph | L | $C_{14}H_{29}$ |
| 38 | $C_5H_{11}$ | — | Np | $-COO-$ | Ph | L | $C_7H_{15}$ |
| 39 | $C_6H_{17}{}^4CFHCH_2O$ | — | Ep1 | — | Ph | L | $C_{10}H_{21}$ |
| 40 | $C_4H_9$ | — | Ep2 | — | Ph | L | $C_6H_{13}$ |
| 41 | $C_6H_{13}$ | — | Gp1 | — | Ph | L | $C_{12}H_{25}$ |
| 42 | $C_7H_{15}$ | — | Gp2 | — | Ph | L | $C_6H_{13}$ |
| 43 | $C_6H_{13}$ | — | Cm1 | — | Ph | L | $C_6H_{17}$ |
| 44 | $C_8H_{17}$ | — | Io1 | — | Ph | L | $C_6H_{13}$ |
| 45 | $C_{20}H_{41}$ | — | Id1 | $-COO-$ | Ph | L | $C_4H_9$ |
| 46 | $C_{11}H_{23}$ | — | Id1 | — | Ph | L | $C_8H_{17}$ |
| 47 | $C_8H_{17}$ | — | Id1 | — | Ph | L | $C_8H_{17}$ |
| 48 | $C_5H_{11}$ | — | Id1 | — | Ph2F | L | $C_6H_{13}$ |
| 49 | $C_6H_{13}$ | — | Tn | — | Ph | L | $C_2H_{15}$ |
| 50 | $C_4H_9O$ | — | Tz2 | — | Ph | L | $C_9H_{19}$ |
| 51 | $C_{12}H_{25}$ | — | Btb2 | — | Ph | L | $C_6H_{13}$ |
| 52 | $C_6H_{13}O$ | — | Btb2 | — | Ph | L | $C_9H_{19}$ |
| 53 | $CH_2=CH(CH_2)_2O$ | — | Ep2 | — | Ph | L | $C_5H_{13}$ |
| 54 | $C_9H_{19}$ | — | Gp2 | — | Ph | L | $C_5H_{11}$ |
| 55 | $C_5H_{11}O$ | — | Np | — | Ph | L | $C_{10}H_{21}$ |
| 56 | $C_6H_{13}$ | Ph | Ph | — | Ph | L | $C_3H_7$ |
| 57 | F | Pr2 | Ph | — | Ph | L | $C_6H_{12}$ |
| 58 | $C_3H_7$ | Py2 | Ph | — | Ph | L | $C_6H_{17}$ |
| 59 | $C_5H_{11}$ | — | Ha2 | — | Ph | L | $C_{11}H_{23}$ |
| 60 | $C_6H_{13}$ | Ph | Pr2 | — | Ph | L | $C_5H_{13}$ |
| 61 | $C_9H_{19}$ | Ph | Pr1 | — | Ph | L | $C_5H_{11}$ |
| 62 | $C_{13}H_{27}$ | Ph | Cy | — | Ph3Br | L | $C_7H_{15}$ |
| 63 | $C_{10}H_{21}O$ | Ph | Py1 | — | Ph | L | $C_6H_{13}$ |
| 64 | $C_7H_{15}$ | Ph | Py2 | — | Ph | L | $C_{10}H_{21}$ |
| 65 | $C_4H_9$ | Ph3TF | Pa | — | Ph | L | $(CH_2)_3CH(CH_3)_2$ |
| 66 | H | — | Hb2 | — | Ph | L | $C_8H_{17}$ |
| 67 | $C_8H_{17}$ | Ph | Tn | — | Ph | L | $C_5H_{11}$ |
| 68 | $C_2H_5$ | Ph | Tz1 | — | Ph2M | L | $C_3H_7$ |
| 69 | $C_5H_{13}$ | Ph | Tz2 | — | Ph | L | $C_5H_{13}$ |

TABLE B-continued (for Compounds Nos. B-1 to B-105)

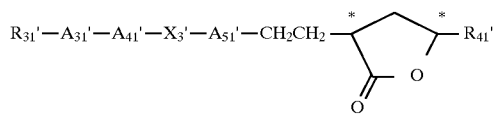

| No. | $R_{31}'$ | $A_{31}'$ | $A_{41}'$ | $X_3'$ | $A_{51}'$ | L | $R_{41}'$ |
|---|---|---|---|---|---|---|---|
| 70 | $C_{10}H_{21}$ | Ph | Td | — | Ph | L | $C_7H_{15}$ |
| 71 | $C_{10}H_{21}$ | — | Ph | — | Py1 | L | $C_5H_{13}$ |
| 72 | $C_6H_{13}$ | — | Ph | — | Py1 | L | $C_5H_{13}$ |
| 73 | $C_6H_{13}OCO$ | — | Ph | — | Py1 | L | $C_5H_{11}$ |
| 74 | $C_7H_{15}$ | — | — | — | Pr2 | L | $C_{10}H_{21}$ |
| 75 | $C_9H_{10}$ | — | Ph | — | Pr2 | L | $C_8H_{17}$ |
| 76 | $C_3H_7$ | — | Ph | — | Pr2 | L | $C_6H_{13}$ |
| 77 | $C_6H_{11}O$ | — | — | — | Cy | L | $C_6H_9$ |
| 78 | $C_4H_9$ | — | Ph | $-CH_2O-$ | Cy | L | $C_7H_{15}$ |
| 79 | $C_{12}H_{25}$ | — | Ph | — | Cy | L | $C_3H_7$ |
| 80 | $C_6H_{13}C\equiv C$ | — | Ph | — | Pa | L | $C_6H_{13}$ |
| 81 | $C_6H_{17}O$ | — | Ph | — | Pd | L | $C_5H_{11}$ |
| 82 | $C_3H_7$ | — | Ph2Cl | — | Tn | L | $C_{10}H_{21}$ |
| 83 | $C_4H_9$ | — | Ph | — | Tn | L | $C_7H_{15}$ |
| 84 | $C_6H_{17}$ | — | Ph | — | Tz1 | L | $C_{12}H_{25}$ |
| 85 | $C_4H_6OCH(CH_3)COO$ | — | Ph | — | Tz1 | L | $C_5H_{11}$ |
| 86 | $C_9H_{13}$ | — | Ph2F | — | Td | L | $(CH_2)_3CH(CH_3)C_6H_{13}$ |
| 87 | $C_6H_{11}$ | — | — | — | Np | L | $C_9H_{19}$ |
| 88 | $C_6H_{17}OCH_2CH_2$ | — | Ph | — | Np | L | $C_5H_{11}$ |
| 89 | $C_{11}H_{23}$ | — | Ph | — | Np | L | $C_6H_{13}$ |
| 90 | $C_5H_{11}$ | — | — | — | Ep1 | L | $C_4H_8$ |
| 91 | $CH_3$ | — | Ph | — | Ep1 | L | $C_7H_{16}$ |
| 92 | $C_5H_{13}$ | — | Ph | — | Ep1 | L | $C_6H_{13}$ |
| 93 | $C_9H_{19}O$ | — | — | — | Gp1 | L | $C_8H_{17}$ |
| 94 | $C_6H_{17}$ | — | Ph | — | Gp1 | L | $C_{10}H_{21}$ |
| 95 | $C_3H_7COO$ | — | Ph | — | Gp1 | L | $C_{11}H_{23}$ |
| 96 | $C_4H_9$ | — | Ph | — | Id1 | L | $C_7H_{15}$ |
| 97 | $C_{12}H_{25}$ | — | Ph | — | Io1 | L | $C_6H_{13}$ |
| 98 | $C_{10}H_{21}$ | — | Ph | — | Cm1 | L | $C_5H_{11}$ |
| 99 | $C_6H_{13}$ | — | Ph | — | Ph | L | $(CH_2)_4C_3F_7$ |
| 100 | $C_3H_7$ | Ph | Ph | — | Py1 | L | $C_7H_{15}$ |
| 101 | $C_4H_9$ | Ph2CN | Ph | — | Pr1 | L | $C_4H_9$ |
| 102 | $C_6H_{11}$ | Ph | Ph3F | — | Tz1 | L | $C_3H_7$ |
| 103 | CN | Ph | Ph | — | Tn | L | $CH_3$ |
| 104 | $C_7H_{15}$ | Tn | Ph | — | Py1 | L | $C_5H_{17}$ |
| 105 | $C_{10}H_{21}$ | Ph | Ph | — | Cy | L | $C_6H_{13}$ |

In Table B, the respective abbreviations mean the following groups, respectively.

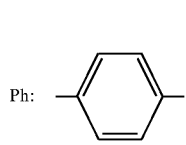

Ph:

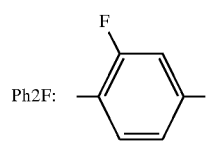

Ph2F:

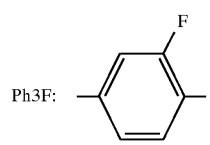

Ph3F:

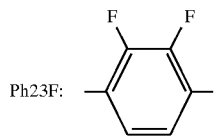

Ph23F:

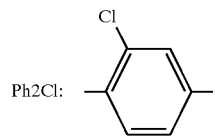

Ph2Cl:

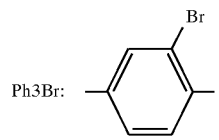

Ph3Br:

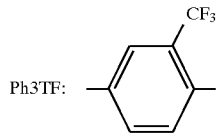

Ph3TF:

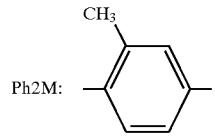

Ph2M:

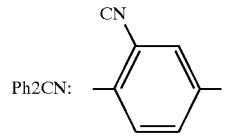

Ph2CN:

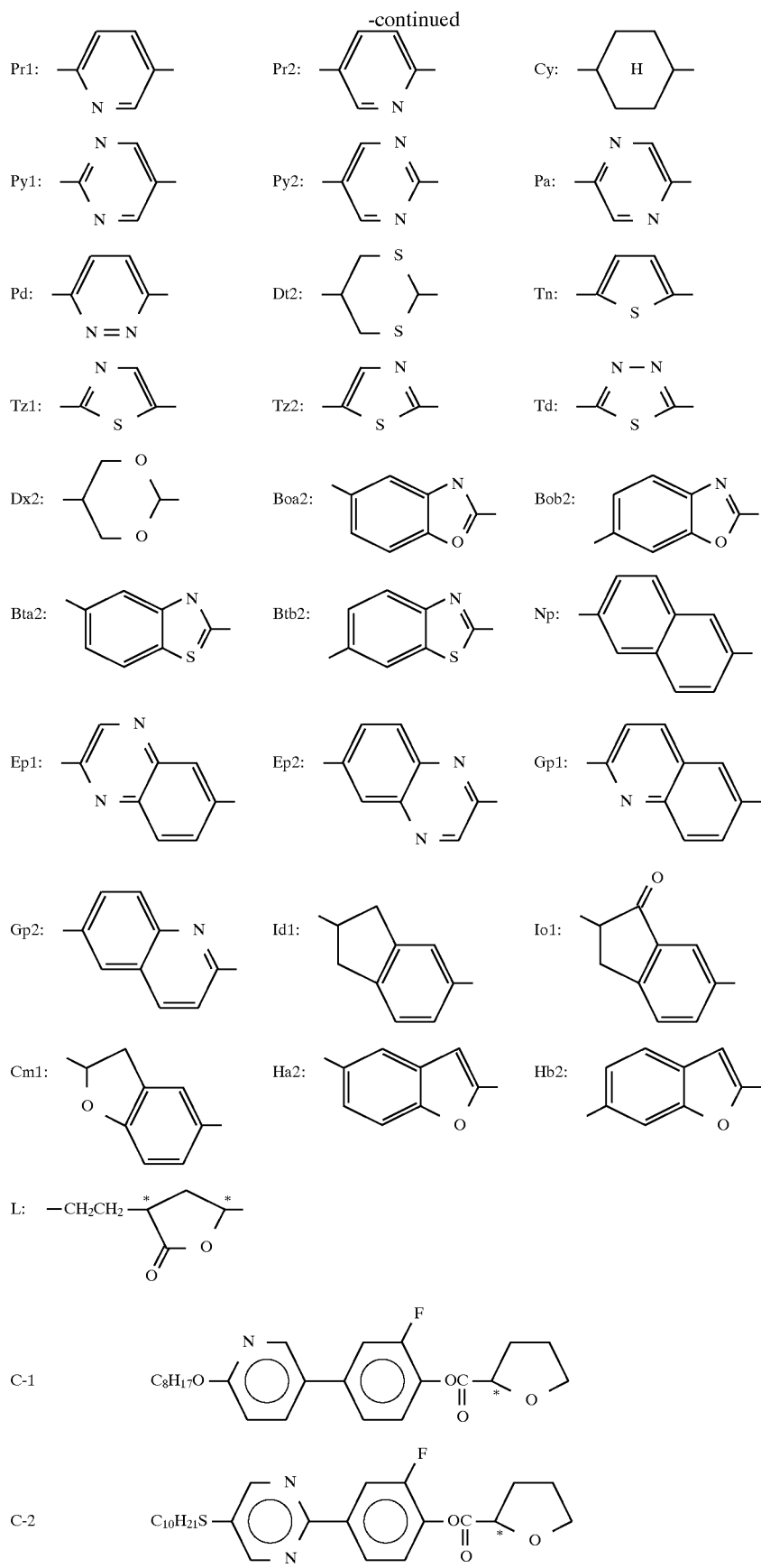

-continued
C-3 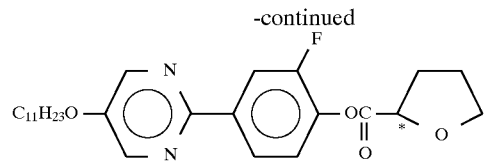
C-4 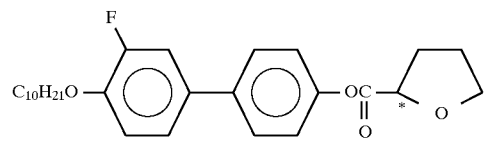
C-5 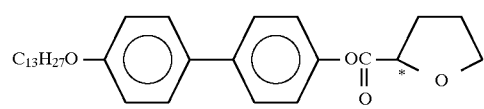
C-6 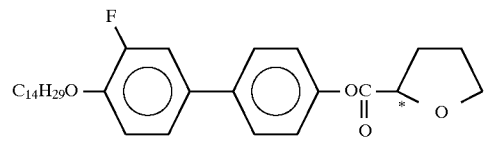
C-7 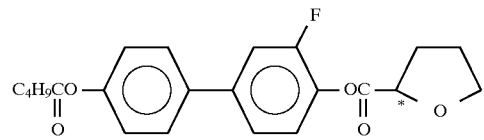
C-8 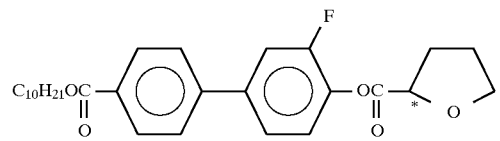
C-9 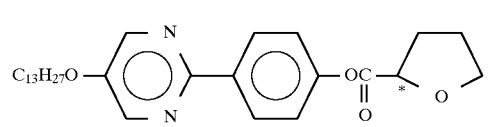
C-10 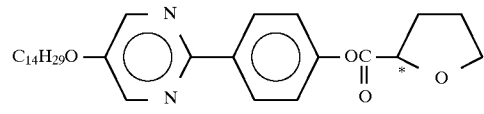
C-11 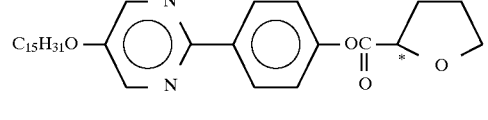
C-12 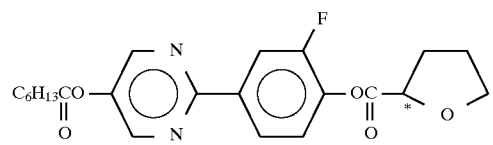
C-13 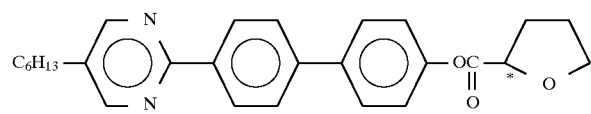
C-14

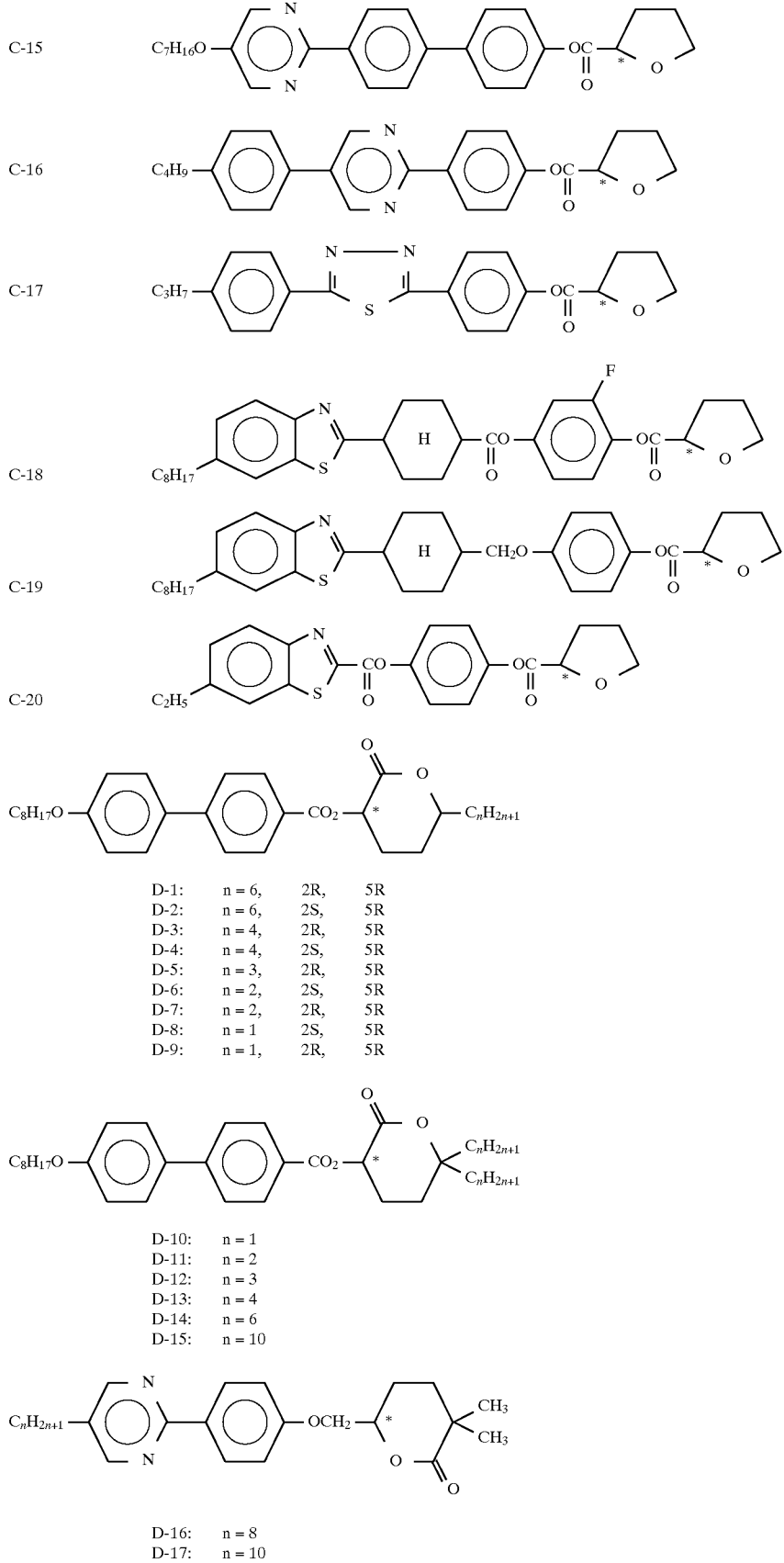

-continued
E-1: (2,5-cis) 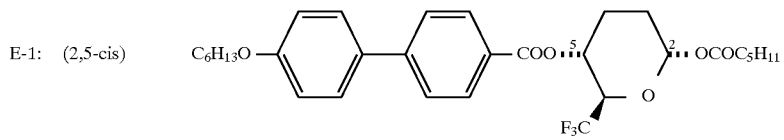
E-2: (2,5-cis)
E-3: (2,5-trans) 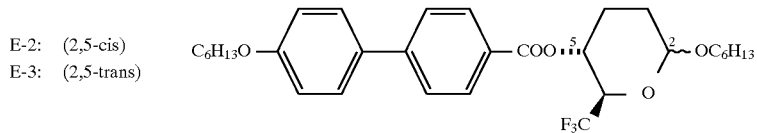
E-4: (2,5-cis)
E-5: (2,5-trans) 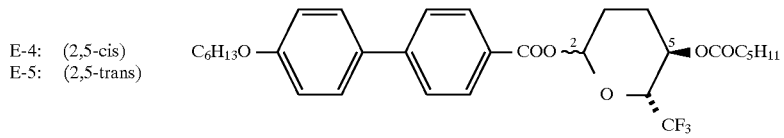
E-6: (2,5-cis)
E-5: (2,5-trans) 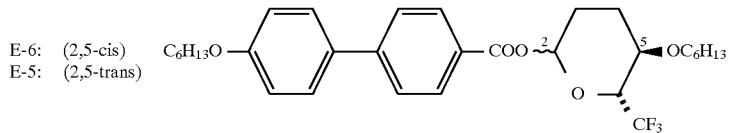
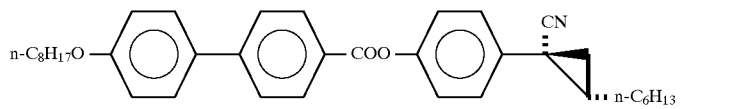
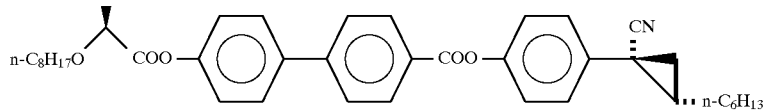
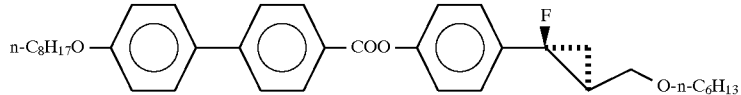
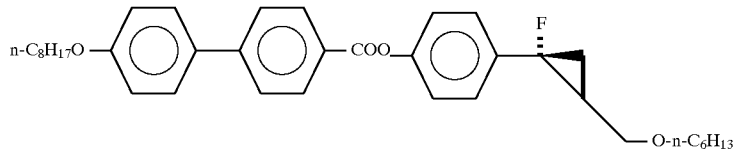

-continued

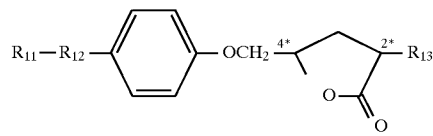

| $R_{11}$ | $R_{12}$ | $R_{13}$ | Configuration |
|---|---|---|---|
| 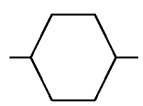 | $C_5H_{11}$ | $C_4H_9$ | 2S, 4S (cis) |
|  | $C_5H_{11}$ | $C_4H_9$ | 2R, 4S (trans) |
|  | $C_8H_{17}$ | $C_3H_7$ | 2S, 4R (cis) |
| 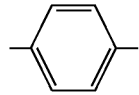 | $C_8H_{17}$ | $C_3H_7$ | 2R, 4S (trans) |
| 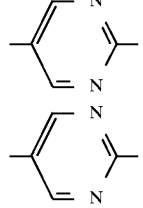 | $C_8H_{17}O$ | $C_4H_9$ | 2S, 4S (cis) |
| 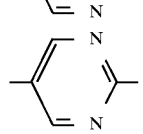 | $C_8H_{17}O$ | $C_4H_9$ | 2R, 4S (trans) |

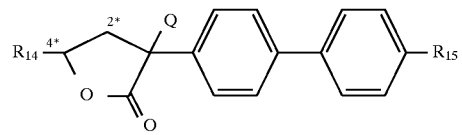

| $R_{14}$ | $R_{15}$ | Q | Configuration |
|---|---|---|---|
| $C_6H_{11}$ | $C_7H_{15}$ | H | 2R, 4S (cis) |
| $C_6H_{11}$ | $C_7H_{15}$ | H | 2S, 4S (trans) |
| $C_7H_{15}$ | $OC_9H_{19}$ | H | 2R, 4S (cis) |
| $C_7H_{15}$ | $OC_9H_{19}$ | H | 2S, 4S (trans) |
| $C_6H_{13}OCH_2$ | $C_7H_{15}$ | H | 2R, 4S (cis) |
| $C_6H_{13}OCH_2$ | $C_7H_{15}$ | H | 2S, 4S (trans) |
| $C_6H_{13}OCH_2$ | $OC_9H_{19}$ | H | 2R, 4S (cis) |
| $C_6H_{13}OCH_2$ | $OC_9H_{19}$ | H | 2S, 4S (trans) |
| $C_{17}H_{15}$ | $OC_9H_{19}$ | $CH_3$ | 2R, 4S (cis) |
| $C_7H_{15}$ | $OC_9H_{19}$ | $CH_3$ | 2S, 4S (trans) |

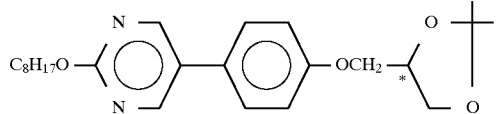

-continued
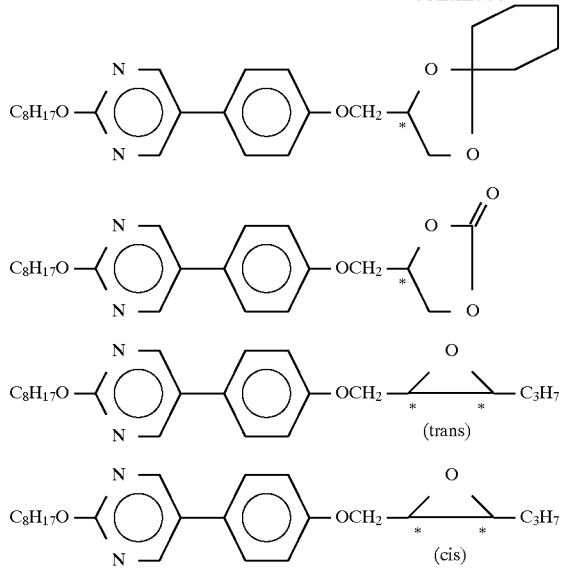
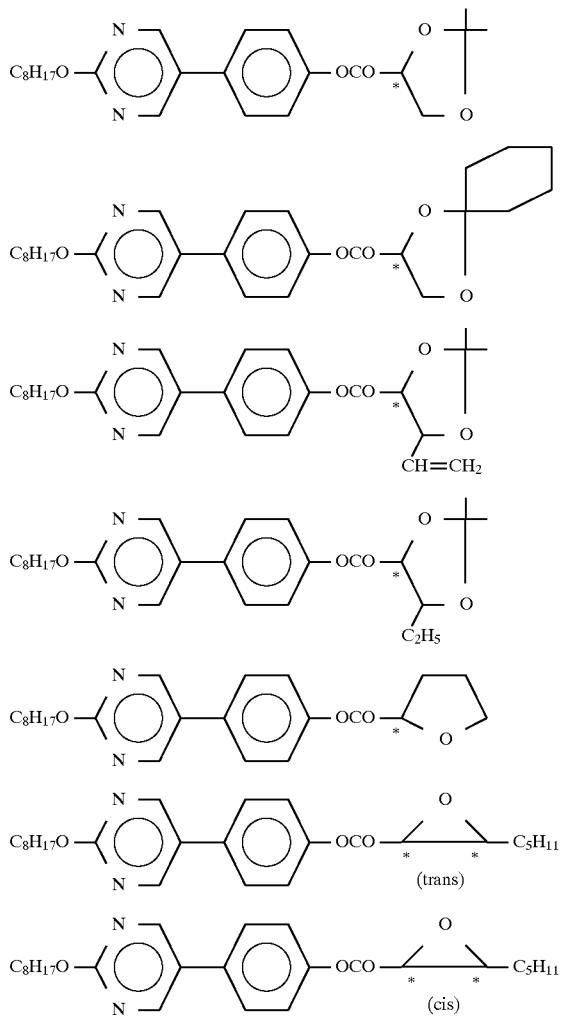

The chiral smectic liquid crystal composition used in the invention may further contain additives such as an antioxidant, an ultraviolet ray-absorbing agent, dyes and pigments.

The liquid crystal device according to the present invention is used as a display element (medium), for various liquid crystal apparatus, one embodiment of which is described below.

Figure 2:
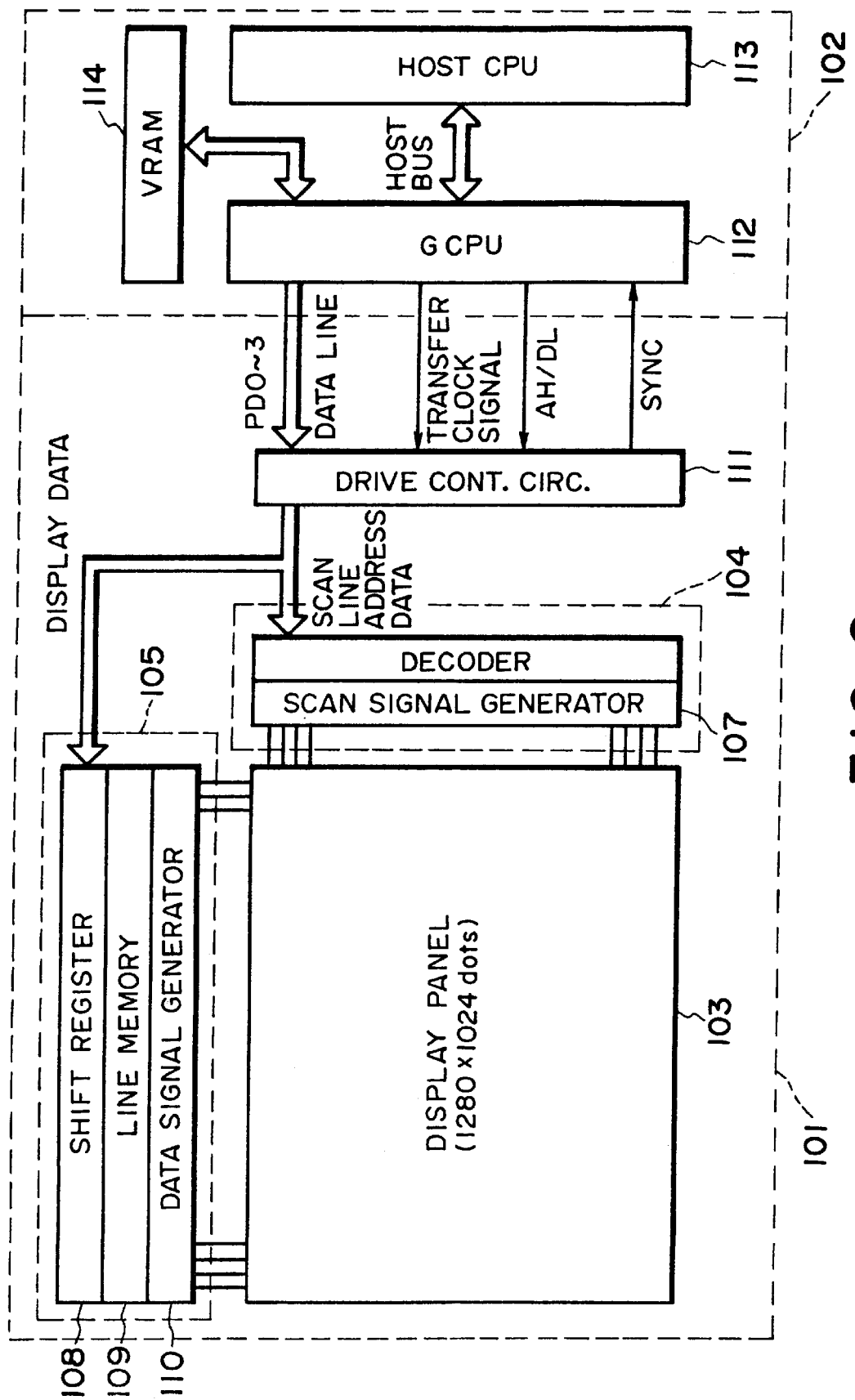
FIG. 2 is a block diagram showing a display apparatus comprising a liquid crystal device of the present invention and a graphic controller.
Figure 3:
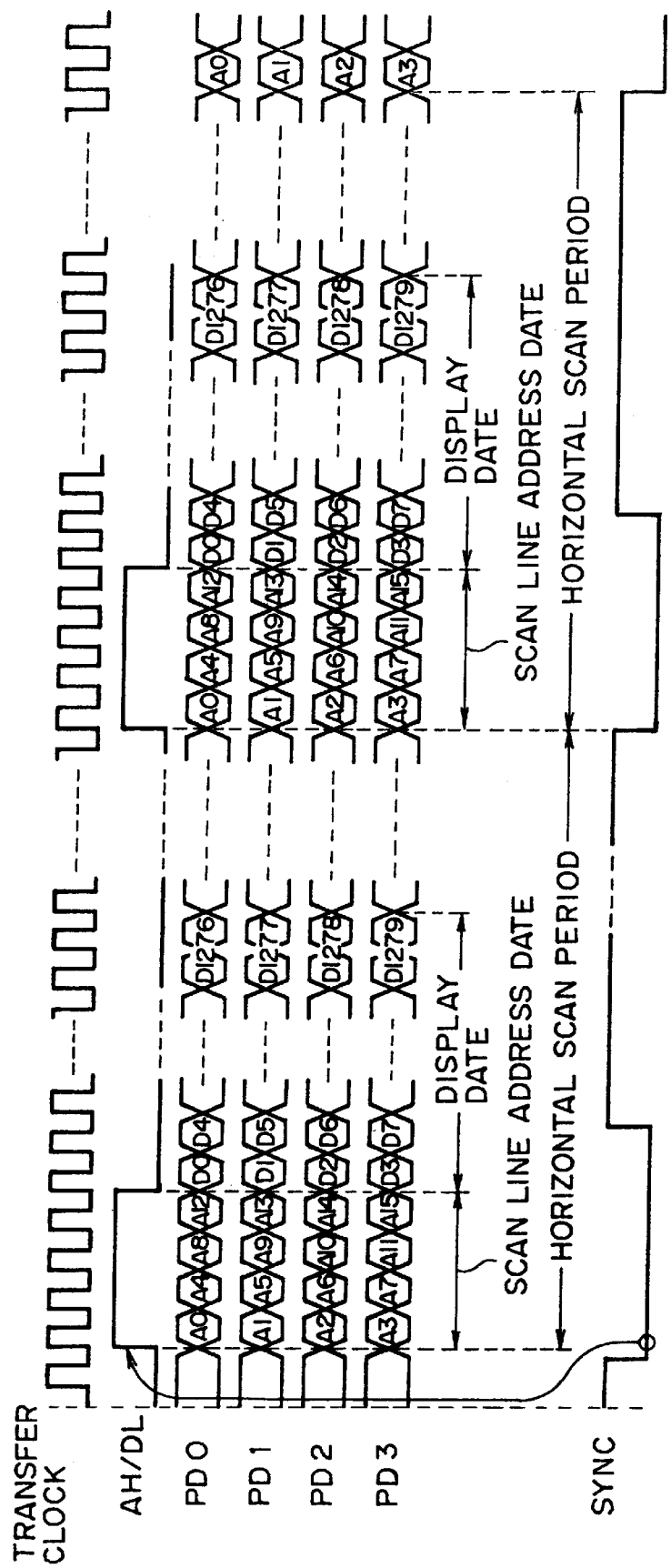
FIG. 3 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 2 and 3, there is provided a liquid crystal display apparatus of the present invention which uses the liquid crystal device according to the present invention as a display panel portion.

Referring to FIG. 2, a chiral smectic liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally performed by the graphic controller 102. A light source (not shown) is disposed at the back of the display panel 103.

The liquid crystal display apparatus of the present invention employs the above-described liquid crystal device showing a good switching characteristic as a display panel (medium), so that the display apparatus exhibits excellent drive characteristics and reliability and provides high-definition and large-area display images at high speed.

The liquid crystal device using the chiral smectic liquid crystal composition according to the present invention may be driven by driving methods as disclosed in, e.g., JP-A 59-193426, JP-A 59-193427, JP-A 60-156046 and JP-A 60-156047.

Figure 5:
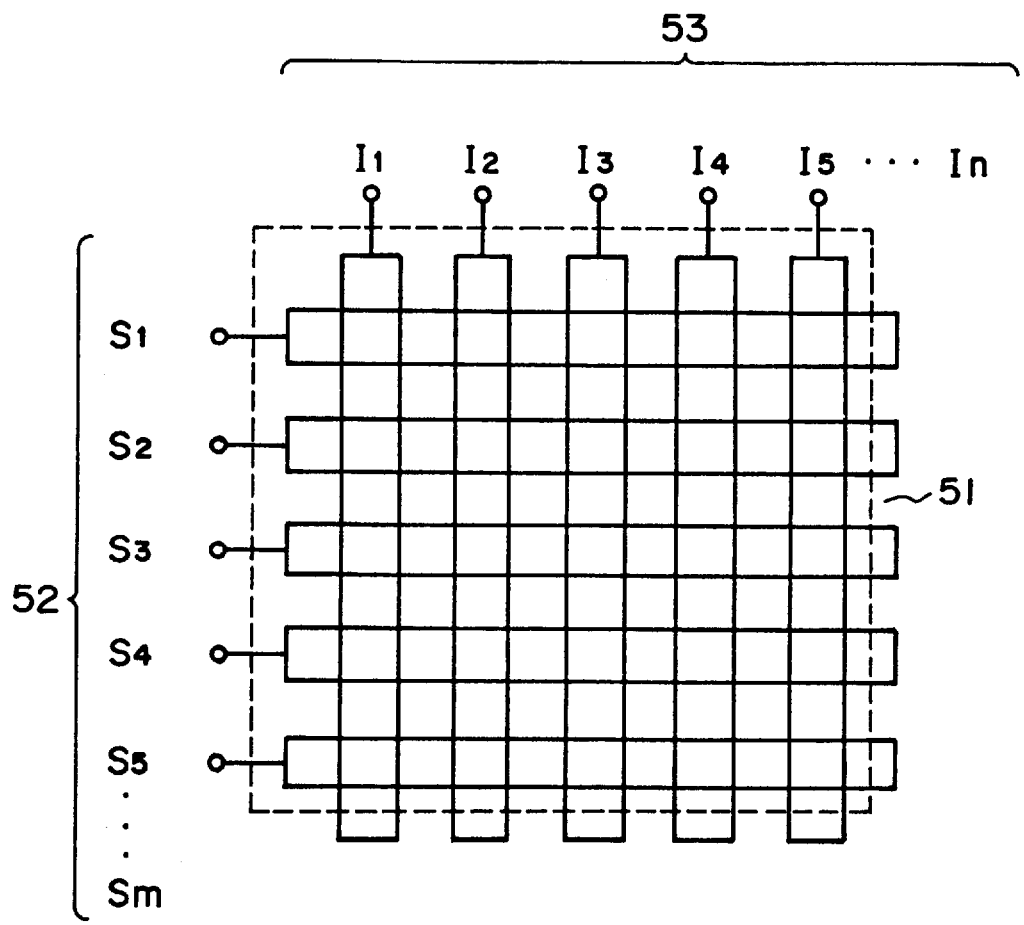
FIG. 5 is a plan view of an electrode matrix.
Figure 6A:
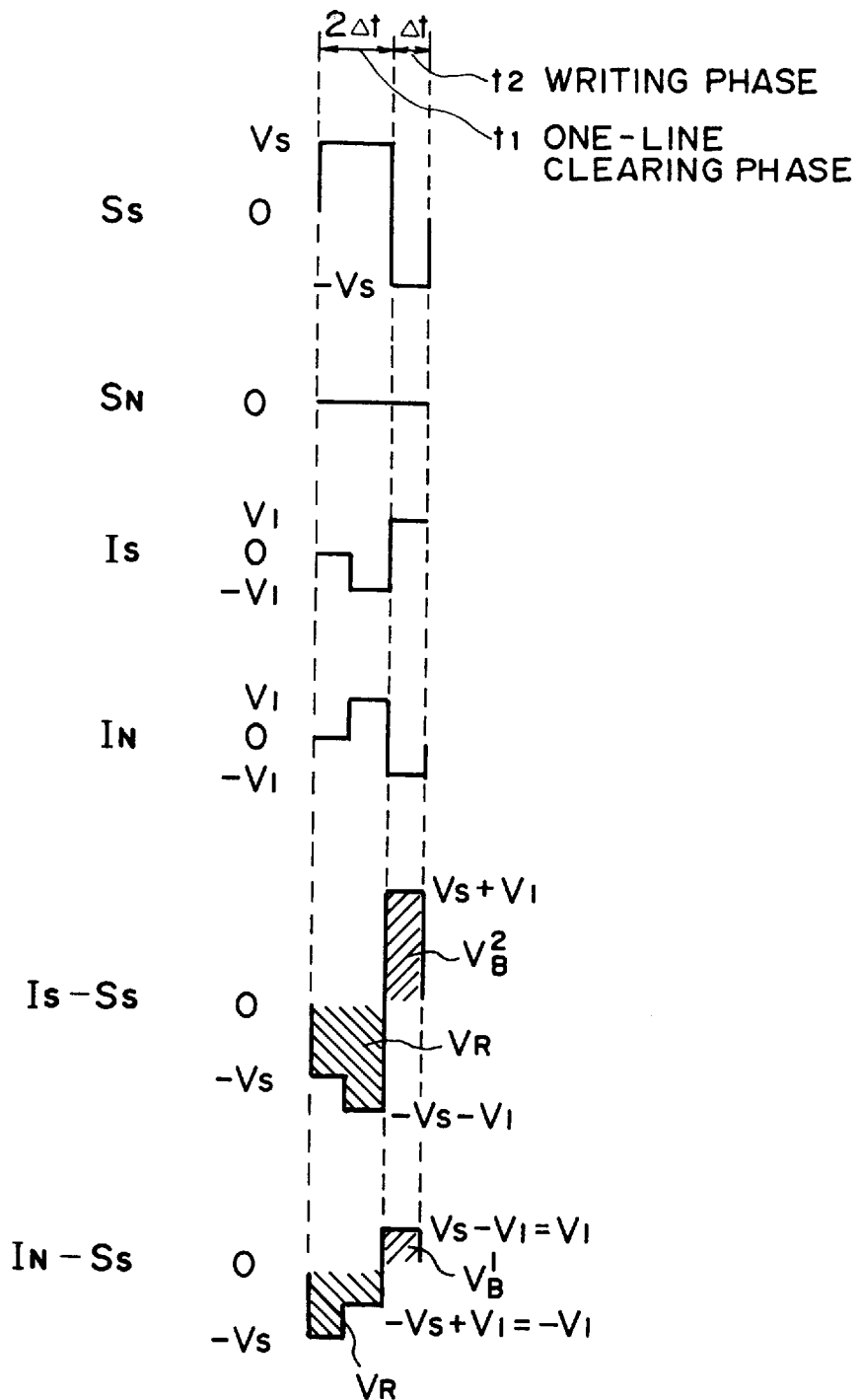
FIG. 6A shows an embodiment of unit driving waveforms and FIG. 6B is time-serial waveforms comprising a succession of such unit waveforms.
Figure 6B:
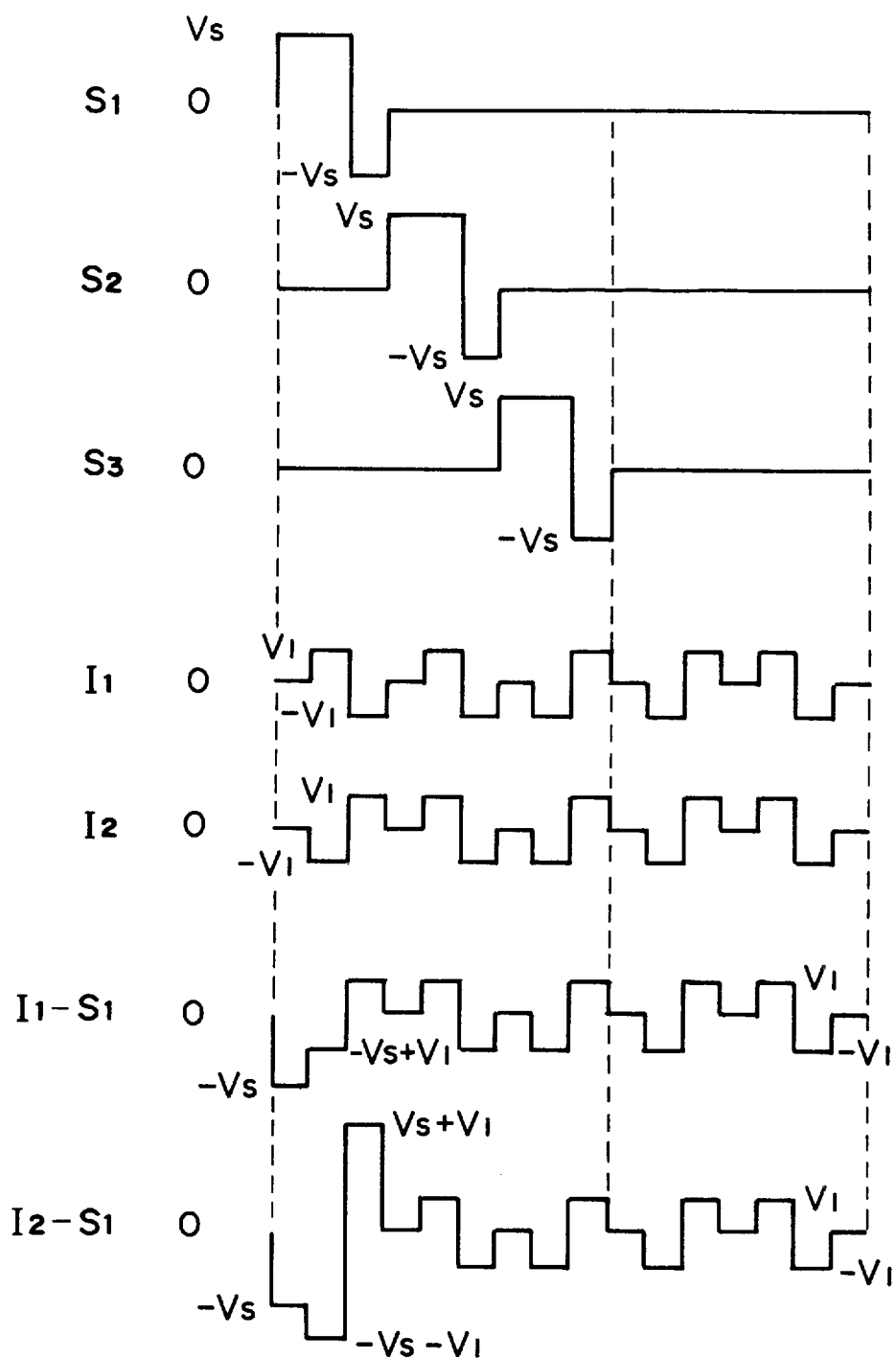

FIGS. 6A and 6B are waveform diagrams showing an example set of driving waveforms used in such a driving method. FIG. 5 is a plan view showing an electrode matrix used in a chiral smectic liquid crystal panel 51 of a simple matrix-type. The liquid crystal panel 51 shown in FIG. 5 includes scanning electrodes 52 ($S_1, S_2, S_3, \ldots S_m$) and data electrodes 53 ($I_1, I_2, I_3, \ldots I_n$) intersecting each other so as to constitute a pixel at each intersection together with a chiral smectic liquid crystal disposed between the scanning electrodes 52 and data electrodes 53.

Figure 4:
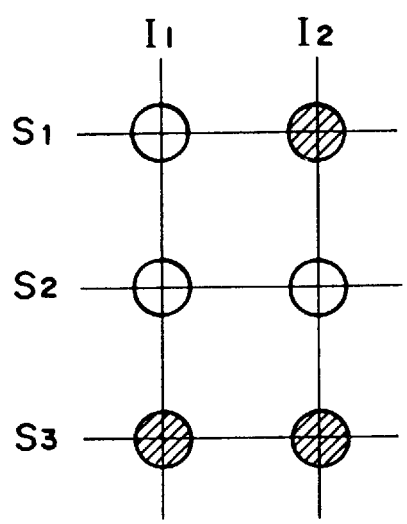
FIG. 4 is an illustration of a display pattern obtained by an actual drive using the time-serial waveforms shown in FIG. 6B.

Referring to FIG. 6A, at $S_S$ is shown a selection scanning signal waveform applied to a selected scanning line, at SN is shown a non-selection scanning signal waveform applied to a non-selected scanning line, at $I_S$ is shown a selection data signal waveform (providing a black display state) applied to a selected data line, and at $I_N$ is shown a non-selection data signal waveform applied to a non-selected data line. Further, at $I_S-S_S$ and $I_N-S_S$ in the figure are shown voltage waveforms applied to pixels on a selected scanning line, whereby a pixel supplied with the voltage $I_S-S_S$ assumes a black display state and a pixel supplied with the voltage $I_N-S_S$ assumes a white display state. FIG. 6B shows a time-serial waveform used for providing a display state as shown in FIG. 4.

In the driving embodiment shown in FIGS. 6A and 6B, a minimum duration (application time) $\Delta t$ of a single polarity voltage applied to a pixel on a selected scanning line corresponds to the period of a writing phase $t_2$, and the period of a one-line clearing phase $t_1$ is set to $2\Delta t$.

The parameters $V_S$, $V_I$ and $\Delta t$ in the driving waveforms shown in FIGS. 6A and 6B are determined depending on switching characteristics of a liquid crystal material used.

Figure 7:
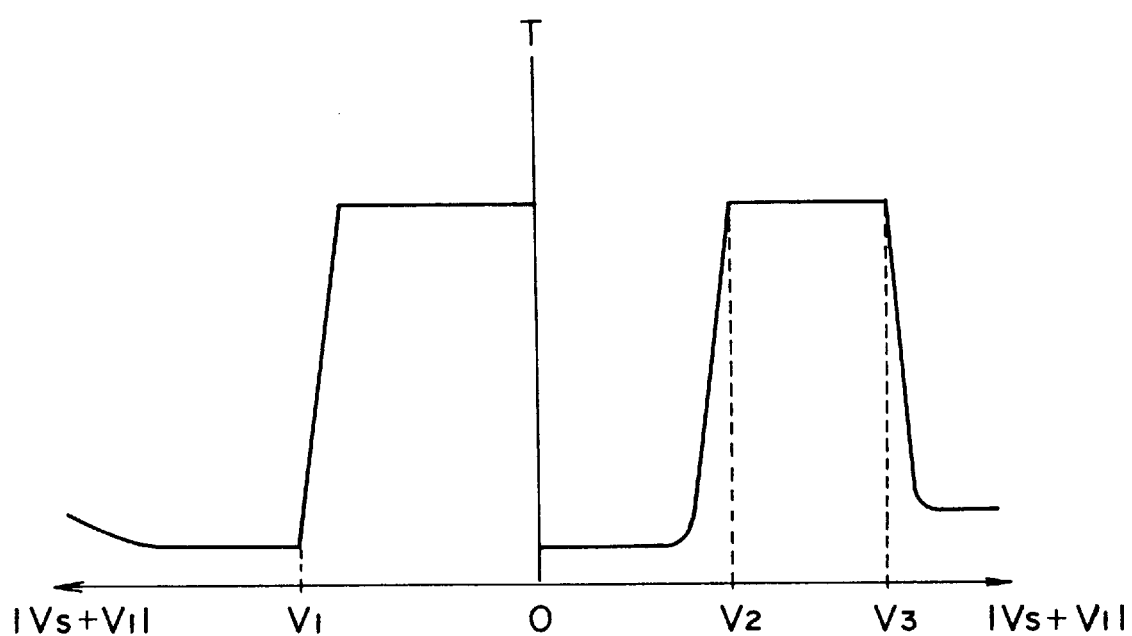
FIG. 7 is a V-T characteristic chart showing a change in transmittance under application of different drive voltages.

FIG. 7 shows a V-T characteristic, i.e., a change in transmittance T when a driving voltage denoted by ($V_S+V_I$) is changed while a bias ratio as mentioned hereinbelow is kept constant. In this embodiment, the parameters are fixed at constant values of $\Delta t=50$ $\mu$s and a bias ratio $V_I/(V_I+V_S)$ =1/3. On the right side of FIG. 7 is shown a result when the voltage ($I_N-S_S$) shown in FIG. 6A is applied to a pixel concerned, and on the left side of FIG. 8 is shown a result when the voltage ($I_S-S^5$) is applied to a pixel concerned, respectively while increasing the voltage ($V_S+V_I$). On both sides of the ordinate, the absolute value of the voltage ($V_S+V_I$) is separately indicated. At ($I_N-S_S$) and ($I_S-S_S$) a previous (display) state is cleared by applying a voltage $V_R$ and a subsequent (display) state is determined by voltages $V_B^1$ and $V_B^2$, respectively. Referring to FIG. 8, a relationship of $V_2<V_1<V_3$ holds. The voltage $V_1$ may be referred to as a threshold voltage in actual drive and the voltage $V_3$ may be referred to as a crosstalk voltage. More specifically, as shown in FIG. 6A, a voltage $V_1$ denotes a voltage value causing switching by applying a voltage signal $V_B^2$ and a voltage $V_3$ denotes a voltage value causing switching by applying a voltage signal $V_B^1$. Further, a voltage $V_2$ denotes a voltage value required for clearing the previous state by applying a voltage signal $V_R$. The crosstalk voltage $V_3$ is generally present in actual matrix drive of a ferroelectric liquid crystal device. In an actual drive, $\Delta V=(V_3-V_1)$ provides a range of $|V_S+V_I|$ allowing a matrix drive and may be referred to as a (drive) voltage margin, which is preferably large enough. It is of course possible to increase the value of $V_3$ and thus $\Delta V(=V_3-V_1)$ by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about 1/3–1/4 was practical. On the other hand, when the bias ratio is fixed, the voltage margin $\Delta V$ strongly depends on the switching characteristics of a liquid crystal material used, and it is needless to say that a liquid crystal material providing a large $\Delta V$ is very advantageous for matrix drive.

Further, it is possible to drive the liquid crystal device by changing a voltage application time (duration) $\Delta t$ while keeping the driving voltage ($V_I+V_S$) so as to provide a certain (constant) value. In this case, the drive characteristic of the liquid crystal device can be evaluated in terms of a duration margin (voltage application time margin) $\Delta T=\Delta t_2-\Delta t_1$ wherein $\Delta t_1$ denotes a threshold duration and $\Delta t_2$ denotes a crosstalk duration. The duration margin $\Delta T$ means a duration allowing a matrix drive under application of a certain driving voltage ($V_I+V_S$).

The upper and lower limits of application voltages or durations and a difference therebetween (driving voltage margin $\Delta V$ or duration margin $\Delta T$) by which selected pixels are written in two states of "black" and "white" and non-selected pixels can retain the written "black" and "white" states at a constant temperature as described above, vary depending on and are intrinsic to a liquid crystal material used and a cell structure employed. Further, the driving margin (voltage or duration margin) is deviated according to a change in environmental temperature, so that optimum driving conditions should be required of an actual display apparatus in view of a liquid crystal material used, a cell (device) structure and an environmental temperature.

Hereinbelow, the present invention will be described more specifically based on Examples. It is however to be understood that the present invention is not restricted to these Examples.

In the following examples, chiral smectic liquid crystal compositions were prepared by mixing the following mesomorphic compounds indicated proportions (in respective examples).

<Porfluoroalkyl-type mesomorphic compound>

| Example Compound No. | |
|---|---|
| (1) | $C_8H_{17}$—pyrazine—phenyl—$OCH_2C_7F_{15}$ |
| (2) | $C_9H_{19}$—pyrazine—phenyl—$OCH_2C_7F_{15}$ |

-continued

| Example Compound No. | |
|---|---|
| (3) | $C_{10}H_{21}$—pyrazine—phenyl—$OCH_2C_7F_{15}$ |

<Perfluoroether-type mesomorphic compound>

| Ex. Comp. No. | |
|---|---|
| (4) | $C_8H_{17}$—pyrazine—phenyl—$OCH_2CF_2OCF_2CF_2OC_4F_9$ |
| (5) | $C_8H_{17}$—pyrazine—phenyl—$OCH_2CF_2(OC_2F_4)_2OCF_3$ |
| (6) | $C_{10}H_{21}$—pyrazine—phenyl—$OCH_2CF_2(OC_2F_4)_2OCF_3$ |
| (7) | $C_8H_{17}$—pyrazine—phenyl—$OCH_2C_3F_6OC_4F_9$ |
| (8) | $C_{10}H_{21}$—pyrazine—phenyl—$OCH_2C_3F_6OC_4F_9$ |

<Optically active compound>

| Ex. Comp. No. | |
|---|---|
| (a) | $C_6H_{13}O$—phenyl—phenyl—$CO_2$—*—*—$OC_6H_{13}$ (with O and $CF_3$) |
| (b) | $C_8H_{17}O$—pyrazine—phenyl—$OCH_2$—*—$C(CH_3)_2$—O—C(=O) |
| (c) | $C_{10}H_{21}$—pyrazine—phenyl—$OCH_2CH(F)$—*—$C_6H_{13}$ |

Example 1

Each of five blank cells was prepared as follows.

To one of glass plates provided with an ITO film having a prescribed pattern, a solution of 6,6-nylon in formic acid was applied by spin coating, followed by drying and subjecting the resultant nylon film to rubbing treatment to form a 50 Å-thick alignment control layer.

To the other glass plate provided with an ITO film having a prescribed pattern, a solution of a silane coupling agent comprising octadecyltriethoxysilane was applied by spin coating, followed by hot curing to form a 20 Å-thick alignment control layer.

After silica beads (average particle size: about 2 μm) as a spacer were dispersed on the other glass plates, the two glass plates were applied to each other to prepare a blank cell having a cell gap of 1.8 μm.

Chiral smectic liquid crystal compositions A to E were prepared by mixing the above-mentioned mesomorphic compounds and optically active compounds in the indicated proportions (wt. parts), respectively.

|             | Compounds (wt. parts) |     |     |     |     |     |     |     |     |     |     |
| ----------- | --- | --- | --- | --- | --- | --- | --- | --- | --- | --- | --- |
| Composition | (1) | (2) | (3) | (4) | (5) | (6) | (7) | (8) | (a) | (b) | (c) |
| A | — | — | — | 45 | 30 | — | 15 | — | 5 | 2 | — |
| B | 3 | 3 | 4 | 40 | 20 | — | 20 | — | 5 | — | — |
| C | 3 | 3 | 4 | 40 | 10 | 10 | 10 | 10 | 5 | 2 | — |
| D | — | — | — | 45 | 20 | — | 20 | — | — | 5 | — |
| E | — | — | — | 45 | 20 | — | 20 | — | — | — | 10 |

Each of the thus prepared liquid crystal compositions A to E was injected in the blank cell in isotropic liquid phase and gradually cooled to a temperature at which chiral smectic phase was assumed, thus preparing a liquid crystal device.

Each of the liquid crystal devices prepared above was driven by applying the set of driving waveforms shown in FIG. 6A on driving conditions including a bias ratio of 1/3 and a driving voltage ($V_r+V_s$) of 18 volts (fixed) while changing a duration (voltage application time) ΔT to measure several duration margins ΔT (μsec) including a duration margin $\Delta T(25)_{50}$ at 25° C. immediately after the injection of the liquid crystal composition, a duration margin $\Delta T(25)_{50}$ at 25° C. after 50 hours from the injection, and a duration period ΔT(15) at 15° C. immediately after the injection.

The results are shown below.

| Composition used | ΔT(25) | $\Delta T(25)_{50}$ | ΔT(15) | (μsec) |
| --- | --- | --- | --- | --- |
| A | 23 | 13 | 5 | |
| B | 19 | 14 | 7 | |
| C | 17 | 10 | 6 | |
| D | 13 | 9 | 4 | |
| E | 10 | 8 | 6 | |

Further, all the liquid crystal devices using the liquid crystal compositions A to E respectively provided a uniform (homogeneous) alignment state after the gradual cooling of the injected liquid crystal composition.

The liquid crystal compositions A to E showed the following layer inclination angles δ at 25° C. as measured according to a method described in Jpn. J. Appl. Phys. 27, p. L725 (1988).

| Composition | Layer inclination angle δ (deg.) |
| --- | --- |
| A | 3.6 |
| B | 6.2 |
| C | 6.5 |
| D | 5.0 |
| E | 5.0 |

Example 2

Liquid crystal devices using the liquid crystal compositions A and C, respectively, were prepared and evaluated in the same manner as in Example 1 except that the alignment control layer obtained from the solution of the silane coupling agent was changed to a 50 Å-thick alignment control layer comprising 6,6-nylon (not subjected to rubbing treatment).

The results are shown below.

| Composition used | ΔT(25) | $\Delta T(25)_{50}$ | (μsec) |
| --- | --- | --- | --- |
| A | 25 | 16 | |
| C | 14 | 10 | |

Reference Example 1

A liquid crystal device using a liquid crystal composition F prepared by mixing the compounds in the indicated proportions shown below was prepared and evaluated in the same manner as in Example 1.

| <Composition F> | |
| --- | --- |
| Compounds: | (1)/(2)/(3)/(4)/(5)/(6)/(7)/(8)/(a) |
| wt.parts: | 3 / 3 / 4 / 70/ - / - / 10/ - / 5 |

The liquid crystal device showed a threshold duration $\Delta t_1$ of 43 μsec and a duration margin ΔT(25) of 4 μsec. However, duration margins $\Delta T(25)_{50}$ and ΔT(15) could not be measured. Further, the liquid crystal composition F showed a layer inclination angle δ (at 25° C.) of 6.1 degrees.

Reference Example 2

Liquid crystal devices using the liquid crystal compositions A and B, respectively, were prepared and evaluated in the same manner as in Example 1 except that the thickness (50 Å) of the 6,6-nylon alignment control layer was changed to 250 Å.

Both of the liquid crystal devices failed to provide duration margins ΔT(25) and $\Delta T(25)_{50}$ (not measurable).

As apparent from the results of the above-described Examples 1 and 2 and Reference Examples 1 and 2, the liquid crystal device using the chiral smectic liquid crystal composition containing first to third perfluoroether-type mesomorphic compounds and employing the alignment control layers one of which has been subjected to rubbing and has a thickness of at most 200 Å according to the present invention provides a good alignment state and excellent drive (margin) characteristics (larger duration margins).

Example 3

Each of five blank cells was prepared as follows.

To one of glass plates provided with an ITO film having a prescribed pattern, a solution of a polyimide precursor (providing a polyimide having a recurring unit of the formula (III') shown below ("LP-64", available from Toray K. K.) in a mixture solvent (n-methylpirrolidone (NMP)/n-butylcellosolve (nBC)=2/1) was applied by spin coating. The thus coated glass plate was subjected to hot curing treatment and a rubbing treatment to form a 50 Å-thick polyimide alignment control layer.

Formula (III')

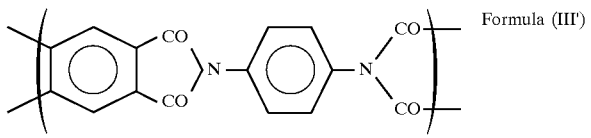

To the other glass plate provided with an ITO film, a solution of a silane coupling agent comprising octadecyltriethoxysilane was applied by spin coating, followed by hot curing to form a 20 Å-thick alignment control layer.

After silica beads (average particle size: about 2 μm) as a spacer were dispersed on the other glass plate, the two glass plates were applied to each other to prepare a blank cell having a cell gap of 1.8 μm.

Into the thus prepared blank cells, the liquid crystal compositions A to E prepared in Example 1 were injected in a similar manner to prepare five liquid crystal devices, respectively.

Each of the thus prepared liquid crystal devices was evaluated in the same manner as in Example 1.

| Composition used | $\Delta T(25)$ | $\Delta T(25)_{50}$ | $\Delta T(15)$ | (μsec) |
|---|---|---|---|---|
| A | 22 | 15 | 8 | |
| B | 18 | 13 | 7 | |
| C | 20 | 11 | 6 | |
| D | 14 | 10 | 9 | |
| E | 12 | 7 | 6 | |

Further, all the liquid crystal devices using the liquid crystal compositions A to E respectively provided a uniform (homogeneous) alignment state after the gradual cooling of the injected liquid crystal composition.

Example 4

Liquid crystal devices using the liquid crystal compositions A and C, respectively, were prepared and evaluated in the same manner as in Example 3 except that the polyimide alignment control layer was changed to a 50 Å-thick polyimide alignment control layer having the following recurring unit:

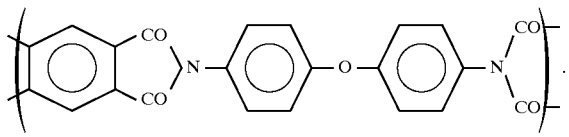

The results are shown below.

| Composition used | $\Delta T(25)$ | $\Delta T(25)_{50}$ | (μsec) |
|---|---|---|---|
| A | 24 | 15 | |
| C | 16 | 10 | |

Reference Example 3

A liquid crystal device using the liquid crystal composition F prepared in Reference Example 1 was prepared and evaluated in the same manner as in Example 3.

The liquid crystal device showed a threshold duration $\Delta t_1$ of 43 μsec, a duration margin $\Delta T(25)$ of 4 μsec and a duration margin $\Delta T(25)_{50}$ of 2 μsec. However, a duration margin $\Delta T(15)$ could not be measured.

Reference Example 4

Liquid crystal devices using the liquid crystal compositions A and B, respectively, were prepared and evaluated in the same manner as in Example 3 except that the (polyimide) alignment control layer was changed to a 250 Å-thick polyvinyl alcohol alignment control film (polyvinyl alcohol, available from Aldrich Co.).

Both of the liquid crystal devices failed to provide duration margins $\Delta T(25)$ and $\Delta T(25)_{50}$ (not measurable).

Reference Example 5

Liquid crystal devices using the liquid crystal compositions A, B and C prepared in Example 1 were prepared and evaluated in the same manner as in Example 3 except that the rubbing-treated polyimide alignment control layer was provided to both of the glass plates.

The results are shown below.

| Composition used | $\Delta T(25)$ | $\Delta T(25)_{50}$ | $\Delta T(15)$ | (μsec) |
|---|---|---|---|---|
| A | 8 | —* | — | |
| B | 6 | — | — | |
| C | 9 | — | — | |

*— means that the duration margin was not measurable.

As apparent from the results of the above-described Examples 3 and 4 and Reference Examples 3–5, the liquid crystal device using the chiral smectic liquid crystal composition containing first to third perfluoroether-type mesomorphic compounds and employing the alignment control layers one of which has been subjected to rubbing and is a polyimide alignment control film according to the present invention provides a good alignment state and excellent drive (margin) characteristics (larger duration margins).

As described hereinabove, according to the present invention, there is provided a chiral smectic liquid crystal device using a specific cell structure and a specific chiral smectic liquid crystal composition capable of exhibiting a bookshelf structure or a structure closer thereto having a small layer inclination angle, so that it is possible to provide improved performances including a high responsiveness, a high contrast ratio, a large picture area, a high definition, a high brightness, and particularly a good drive characteristic (wider duration margin) in a wide temperature range. In the liquid crystal device, the cell structure includes at least one thin (at most 200 Å) alignment control film or at least one polyimide film and a pair of substrates (electrode plates) provided with alignment control layers subjected to different aligning treatments (e.g., only one of the alignment control layers is subjected to rubbing), thereby allowing a high reliability and a drive stability.

What is claimed is:

1. A liquid crystal device, comprising: a pair of substrates each having thereon an electrode for voltage application, a chiral smectic liquid crystal composition disposed between the substrates,
   wherein at least one of the substrates is provided with an alignment control layer having a thickness of at most 200 Å and having been subjected to rubbing, the substrates having been subjected to different aligning treatments at their opposite faces each contacting the chiral smectic liquid crystal composition , and
   the chiral smectic liquid crystal composition comprises at least three fluorine-containing mesomorphic compounds each comprising a fluorocarbon terminal portion having at least one catenary ether oxygen atom and a hydrocarbon terminal portion, the terminal portions being connected with a central core, the compounds having smectic mesophase or latent smectic mesophase; said at least three mesomorphic compounds comprising at least one species of a compound having a fluorocarbon terminal portion containing one catenary ether oxygen atom, at least one species of a compound having a fluorocarbon terminal portion containing two catenary ether oxygen atoms, and at least one species of a compound having a fluorocarbon terminal portion containing three catenary ether oxygen atoms.

2. A device according to claim 1, wherein one of the substrates is provided with an alignment control layer having been subjected to rubbing.

3. A liquid crystal device according to claim 1, wherein said fluorocarbon terminal portion of each of said at least three fluorine-containing mesomorphic compounds is represented by the formula $-D^2-(C_{xb}F_{2xb}-O)_{za}-C_{ya}F_{2ya+1}$, where xb is independently 1–10 independently for each $(C_{xb}F_{2xb}-O)$; ya is 1–10; za is 1–10; $-D^2-$ is $-CO-O-C_{rc}H_{2rc}$, $-O-C_{rc}H_{2rc}-$, $-C_{rc}H_{2rc}-$, $-O-(C_{sa}H_{2sa}-O)_{ta}-C_{rd}H_{2rd}-$, $-O-SO_2-$, $-SO_2-$, $-SO_2-C_{rc}H_{2rc}-$, $-C_{rc}H_{2rc}-N(C_{pb}H_{2pb+1})-SO_2-$, $-C_{rc}H_{2rc}-N(C_{pb}H_{2pb+1})-CO-$, or a covalent bond where rc and rd are independently 1–20; sa is independently 1–10 for each $(C_{sa}H_{2sa}-O)$; ta is 1–6; and pb is 0–4.

4. A liquid crystal device according to claim 1, wherein each of said at least three fluorine-containing mesomorphic compounds is represented by the general formula (II):

Formula (II):

Formula (II):
$$R^4-(A^4)_{gb}-L^3-(A^5)_{hb}-L^4-(A^6)_{ib}-J^2-R^5,$$
$$\phantom{R^4-(A^4)}|_{X^2_{jb}} \phantom{-L^3-(A^5)}|_{Y^2_{mb}} \phantom{-L^4-(A^6)}|_{Z^2_{nb}}$$

where $A^4$, $A^5$ and $A^6$ are each independently denote

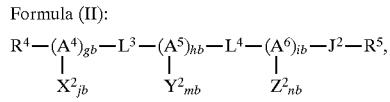

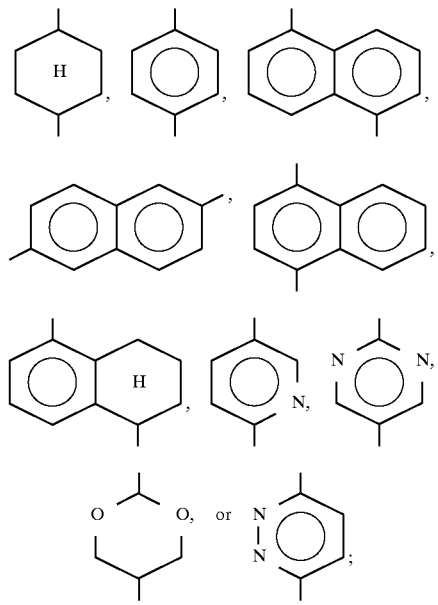

gb, hb and ib are each independently an integer of 0–3 with the proviso that the sum of gb+hb+ib be at least 2;

each $L^3$ and $L^4$ are independently a single bond, $-CO-O-$, $-O-CO-$, $-CO-S-$, $-S-CO-$, $-CO-Se-$, $-Se-CO-$, $-CO-Te-$, $-Te-CO-$, $-(CH_2CH_2)_{ka}-$ where ka is 1–4, $-CH=CH-$, $-C\equiv C-$, $-CH=N-$, $-N=CH-$, $-CH_2-O-$, $-O-CH_2-$, $-CO-$ or $-O-$;

$X^2$, $Y^2$ and $Z^2$ are each a substituent of $A^4$, $A^5$ and $A^6$, respectively, and each $X_2$, $Y_2$ and $Z_2$ are independently $-H$, $-Cl$, $-F$, $-Br$, $-I$, $-OH$, $-OCH_3$, $-CH_3$, $-CF_3$, $-O-CF_3$, $-CN$ or $-NO_2$; each jb, mb and nb are independently an integer of 0–4;

$J^2$ is $-CO-O-C_{rc}H_{2rc}-$, $-O-C_{rc}H_{2rc}-$, $-C_{rc}H_{2rc}-$, $-O-(C_{sa}H_{2sa}-O)_{ta}-C_{rd}H_{2rd}-$, $-O-SO_2-$, $-SO_2-$, $-SO_2-C_{rc}H_{2rc}-$, $-C_{rc}H_{2rc}-N(C_{pb}H_{2pb+1})-SO_2-$ or $-C_{rc}H_{2rc}-N(C_{pb}H_{2pb+1})-CO-$ where rc and rd are independently 1–20; sa is independently 1–10 for each $(C_{sa}H_{2sa}-O)$, ta is 1–6; pb is 0–4;

$R^4$ is $-O-(C_{qc}H_{2qc}-O)_{wa}-C_{qd}H_{2qd+1}$, $-(C_{qc}H_{2qc}-O)_{wa}-C_{qd}H_{2qd+1}$, $-C_{qc}H_{2qc}-R^6$, $-O-C_{qc}H_{2qc}-R^6$, $-CO-O-C_{qc}H_{2qc}-R^6$, or $O-CO-C_{qc}H_{2qc}-R^6$ which may be either straight chain or branched where $R^6$ is $-O-CO-C_{qd}H_{2qd+1}$; $-CO-O-C_{qd}H_{2qd+1}$, $-Cl$, $-F$, $-CF_3$, $-NO_2$, $-CN$ or $-H$; qc and qd are independently 1–20; wa is 1–10;

$R^5$ is $(C_{xb}F_{2xb}-O)_{za}-C_{ya}F_{2ya+1}$, where xb is independently 1–10 for each $(C_{xb}F_{2xb}-O)$; ya is 1–10; and za is 1–10.

5. A device according to claim 4, wherein each of said at least three fluorine-containing mesomorphic compounds represented by the formula (II) has a central core containing benzene ring and pyrimidine ring.

6. A device according to claim 1, wherein the liquid crystal composition comprises said at least three fluorine-containing mesomorphic compounds each in an amount of at least 10 wt. %.

7. A device according to claim 1, wherein the liquid crystal composition comprises said at least three fluorine-containing mesomorphic compounds in a total amount of at least 30 wt. %.

8. A device according to claim 1, wherein the liquid crystal composition comprises said at least three fluorine-containing mesomorphic compounds in a total amount of at least 50 wt. %.

9. A liquid crystal device, comprising: a pair of substrates each having thereon an electrode for voltage application, a chiral smectic liquid crystal composition disposed between the substrates, wherein at least one of the substrates is provided with an alignment control layer comprising polyimide and the substrates have been subjected to different aligning treatments at their opposite faces each contacting the chiral smectic liquid crystal composition, and the chiral smectic liquid crystal composition comprises at least three fluorine-containing mesomorphic compounds each comprising a fluorocarbon terminal portion having at least one catenary ether oxygen atom and a hydrocarbon terminal portion, the terminal portions being connected with a central core, the compounds having smectic mesophase or latent smectic mesophase; said at least three mesomorphic compounds comprising at least one species of a compound having a fluorocarbon terminal portion containing one catenary ether oxygen atom, at least one species of a compound having a fluorocarbon terminal portion containing two catenary ether oxygen atoms, and at least one species of a compound having a fluorocarbon terminal portion containing three catenary ether oxygen atoms.

10. A device according to claim 9, wherein said polyimide has a recurring unit represented by the following formula (III):

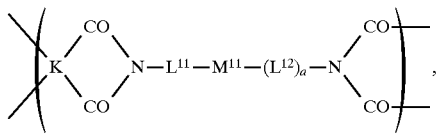

in which

K is

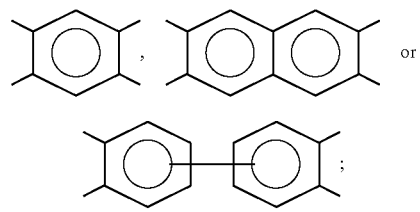

$L^{11}$ and $L^{12}$ independently denote

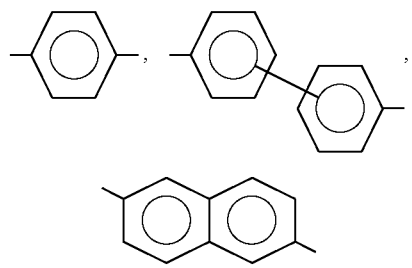

or an alkylene group having 1–20 carbon atoms;

$M^{11}$ is a single bond or —O—; and a is 0, 1 or 2.

11. A device according to claim 9, wherein one of the substrates is provided with an alignment control layer having been subjected to rubbing.

12. A device according to claim 9, wherein the alignment control layer comprising polyimide is provided to at least one of the substrates and has been subjected to rubbing.

13. A device according to claim 9, wherein the alignment control layer comprising polyimide is provided to at least one of the substrates and has a thickness of at most 200 |.

14. A liquid crystal device according to claim 9, wherein said fluorocarbon terminal portion of each of said at least three fluorine-containing mesomorphic compounds is represented by the formula $-D^2-(C_{xb}F_{2xb}-O)_{za}-C_{ya}F_{2ya+1}$, where xb is independently 1–10 independently for each $(C_{xb}F_{2xb}-O)$; ya is 1–10; za is 1–10; $-D^2-$ is $-CO-O-C_{rc}H_{2rc}-, -O-C_{rc}H_{2rc}-, -C_{rc}H_{2rc}-, -O-(C_{sa}H_{2sa}-O)_{ta}-C_{rd}H_{2rd}-, -O-SO_2-, -SO_2-, -SO_2-C_{rc}H_{2rc}-, -C_{rc}H_{2rc}-N(C_{pb}H_{2pb+1})-SO_2-, -C_{rc}H_{2rc}-N(C_{pb}H_{2pb+1})-CO-$, or a covalent bond where rc and rd are independently 1–20; sa is independently 1–10 for each $(C_{sa}H_{2sa}-O)$; ta is 1–6; and pb is 0–4.

15. A liquid crystal device according to claim 9, wherein each of said at least three fluorine-containing mesomorphic compounds is represented by the general formula (II):

Formula (II):

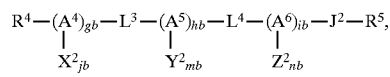

where $A^4$, $A^5$ and $A^6$ are each independently denote

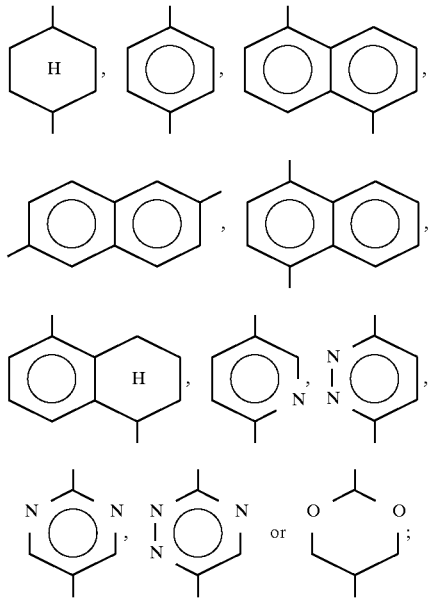

gb, hb and ib are each independently an integer of 0–3 with the proviso that the sum of gb+hb+ib be at least 2; each $L^3$ and $L^4$ are independently a single bond, —CO—O—, —O—CO—, —CO—S—, —S—CO—, —CO—Se—, —Se—CO—, —CO—Te—, —Te—CO—, $-(CH_2CH_2)_{ka}-$ where ka is 1–4, —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is $-CO-O-C_{rc}H_{2rc}-, -O-C_{rc}H_{2rc}-, -C_{rc}H_{2rc}-, -O-(C_{sa}H_{2sa}-O)_{ta}-C_{rd}H_{2rd}-, -O-SO_2-, -SO_2-, -SO_2-C_{rc}H_{2rc}-, -C_{rc}H_{2rc}-N(C_{pb}H_{2pb+1})-SO_2-$ or $-C_{rc}H_{2rc}-N(C_{pb}H_{2pb+1})-CO-$ where rc and rd are independently 1–20; sa is independently 1–10 for each $(C_{sa}H_{2sa}-O)$, ta is 1–6; pb is 0–4;

$R^4$ is $-O-(C_{qc}H_{2qc}-O)_{wa}-C_{qd}H_{2qd+1} -(C_{qc}H_{2qc}-O)_{wa}-C_{qd}H_{2qd+1}, -C_{qc}H_{2qc}-R^6, -O-C_{qc}H_{2qc}-R^6, -CO-O-C_{qc}H_{2qc}-R^6$, or $O-CO-C_{qc}H_{2qc}-R^6$ which may be either straight chain or branched where $R^6$ is $-O-CO-C_{qd}H_{2qd+1}; -CO-O-C_{qd}H_{2qd+1}, -Cl, -F, -CF_3, -NO_2, -CN$ or —H; qc and qd are independently 1–20; wa is 1–10;

$R^5$ is $(C_{xb}F_{2xb}-O)_{za}-C_{ya}F_{2ya+1}$, where xb is independently 1–10 for each $(C_{xb}F_{2xb}-O)$; ya is 1–10; and za is 1–10.

16. A device according to claim 15, wherein each of said at least three fluorine-containing mesomorphic compounds represented by the formula (II) has a central core containing benzene ring and pyrimidine ring.

17. A device according to claim 9, wherein the liquid crystal composition comprises said at least three fluorine-containing mesomorphic compounds each in an amount of at least 10 wt. %.

18. A device according to claim 9, wherein the liquid crystal composition comprises said at least three fluorine-containing mesomorphic compounds in a total amount of at least 30 wt. %.

19. A device according to claim 9, wherein the liquid crystal composition comprises said at least three fluorine-containing mesomorphic compounds in a total amount of at least 50 wt. %.

20. A device according to claim 9, wherein the substrates include a substrate provided with an alignment control layer comprising polyimide and having been subjected to rubbing, and a substrate provided with an alignment control layer comprising a silane coupling agent.

21. A liquid crystal apparatus, including a liquid crystal device according to claim 1 or 9.

* * * * *

UNITED STATES PATENT AND TRADEMARK OFFICE
CERTIFICATE OF CORRECTION

PATENT NO.  : 5,841,497
DATED       : November 24, 1998
INVENTOR(S) : KOICHI SATO ET AL.

It is certified that error appears in the above-indentified patent and that said Letters Patent is hereby corrected as shown below:

On the title page:

[56] REFERENCES CITED

Foreign Patent Documents
    "021427563" should read --2-142753--.

[57] ABSTRACT

Line 7, "or" should be deleted.
    Lines 22-23, "characteristic when driven." should read
        --characteristics.--.

COLUMN 1

Line 16, "outputs" should read --outputting--.
    Line 23, "affects" should read --affects the--.
    Line 24, "health" should read --the health--.
    Line 48, "ten" should read --tens of--.

COLUMN 2

Line 31, "(Editor))" should read --(Editor),--.
    Line 33, "Japan)." should read --Japan)).--.
    Line 46, "unstability" should read --instability--.

COLUMN 4

Line 49, "oxyge" should read --oxygen--.

UNITED STATES PATENT AND TRADEMARK OFFICE
CERTIFICATE OF CORRECTION

PATENT NO. : 5,841,497
DATED : November 24, 1998
INVENTOR(S) : KOICHI SATO ET AL.

It is certified that error appears in the above-indentified patent and that said Letters Patent is hereby corrected as shown below:

COLUMN 5

Line 65, "an" should read --a--.

COLUMN 6

Line 12, "such" should read --in such--.
    Line 46, "the" should read --it to the--.

COLUMN 9

Line 51, "or cycloaliphatic" should read
      --or hetero-cycloaliphatic--.

COLUMN 11

Line 5, "perfluoroethertype" should read
      --perfluoroether-type--.
    Line 14, "are" should be deleted.

COLUMN 19

Line 48, "compound)" should read --compound")--.

COLUMN 21

Line 6, "$H_{2qa-R}^{3}$" should read --$H_{2qa}-R^{3}$--.

UNITED STATES PATENT AND TRADEMARK OFFICE
CERTIFICATE OF CORRECTION

PATENT NO. : 5,841,497
DATED : November 24, 1998
INVENTOR(S) : KOICHI SATO ET AL.

It is certified that error appears in the above-indentified patent and that said Letters Patent is hereby corrected as shown below:

COLUMN 36

Line 64, "-$OC_6H_H$" shold read ---$OC_5H_H$--.

COLUMN 37

Line 2, "$C_6H_{17}$\ " should read --$C_8H_{17}$\ --.

COLUMN 38

Line 55, "-$C_6H_{17}$" should read ---$C_8H_{17}$--.

COLUMN 39

Line 13, "-$C_6H_{17}O$-" should read ---$C_8H_{17}O$---.

COLUMN 40

Line 56, "$C_{18}H_{27}O$-" should read ---$C_{13}H_{27}O$---.

COLUMN 42

No. 3, "$C_6H_{11}O$" should read --$C_5H_{11}O$--.
   No. 14, "ML" should read --Ml--.
   No. 24, "$C_{10}H_{12}$" should read --$C_{10}H_{12}$--.

UNITED STATES PATENT AND TRADEMARK OFFICE
CERTIFICATE OF CORRECTION

PATENT NO. : 5,841,497

DATED : November 24, 1998

INVENTOR(S) : KOICHI SATO ET AL.

Page 4 of 7

It is certified that error appears in the above-indentified patent and that said Letters Patent is hereby corrected as shown below:

<u>COLUMN 43</u>

No. 81, "$C_5H_{13}$" should read --$C_6H_{13}$--.
No. 96, "U" should read --H--.

<u>COLUMN 49</u>

No. 1, "$C_6H_{17}$" should read --$C_8H_{17}$--.
No. 2, "2 $C_6H_{17}O$" should read --2 $C_8H_{17}O$--.
No. 3, "3 $C_6H_{11}O$" should read --3 $C_5H_{11}O$--.
No. 5, "$C_6H_{13}{}^4CHF(CH_2)_2O$" should read
    --$C_6H_{13}CHF(CH_2)_2O$
No. 7, "$C_6H_{19}$" should read --$C_9H_{19}$--.
No. 8, "$C_6H_{11}$" should read --$C_9H_{11}$--.
No. 9, "9 $C_6H_{17}O$" should read --9 $C_8H_{17}O$--.
No. 10, "$C_6H_{17}$" (both occurrences) should read --$C_8H_{17}$--.
No. 13, "13 $C_{12}H_{26}$" should read --13 $C_{12}H_{25}$--; and
    "$C_6H_{17}$" should read --$C_8H_{17}$--.
No. 15, "$C_6H_{11}$" should read --$C_5H_{11}$--.
No. 17, "$C_6H_{13}{}^4CHFCH_2O$" should read --$C_6H_{13}{}^*CHFCH_2O$--.
No. 18, "$C_6H_{11}O$" should read --$C_5H_{11}O$--.
No. 20, "$C_6H_{17}$" should read --$C_8H_{17}$--.
No. 22, "$C_7H_{16}OCO$" should read --$C_7H_{15}OCO$--.
No. 25, "$C_6H_{17}$" should read --$C_8H_{17}$--.
No. 30, "$C_6H_{17}$" should read --$C_8H_{17}$--.
No. 31, "$C_5H_{12}$" should read --$C_5H_{11}$--.
No. 32, "$C_6H_{17}$" should read --$C_8H_{17}$--.
No. 39, "$C_6H_{17}{}^4CHFCH_2O$" should read --$C_8H_{17}{}^*CHFCH_2O$--.

UNITED STATES PATENT AND TRADEMARK OFFICE
CERTIFICATE OF CORRECTION

PATENT NO. : 5,841,497

DATED : November 24, 1998

INVENTOR(S) : KOICHI SATO ET AL.

Page 5 of 7

It is certified that error appears in the above-indentified patent and that said Letters Patent is hereby corrected as shown below:

COLUMN 49 CONTINUED

No. 43, "$C_6H_{17}$" should read --$C_8H_{17}$--.
No. 49, "$C_2H_{15}$" should read --$C_7H_{15}$--.
No. 53, "$C_5H_{13}$" should read --$C_6H_{13}$--.
No. 57, "$C_6H_{12}$" should read --$C_6H_{13}$--.
No. 58, "$C_6H_{17}$" should read --$C_8H_{17}$--.
No. 68, "$C_5H_{13}$" should read --$C_6H_{13}$--.
No. 69, "$C_5H_{13}$" should read --$C_6H_{13}$--.

COLUMN 51

No. 71, "$C_5H_{13}$" should read --$C_6H_{13}$--.
No. 72, "$C_5H_{13}$" should read --$C_6H_{13}$--.
No. 75, "$C_9H_{10}$" should read --$C_9H_{19}$--.
No. 77, "$C_6H_{11}O$" should read --$C_5H_{11}O$--; and "$C_6H_9$" should read --$C_4H_9$--.
No. 81, "$C_6H_{17}O$" should read --$C_8H_{17}O$--.
No. 84, "$C_6H_{17}$" should read --$C_8H_{17}$--.
No. 86, "$C_9H_{13}$" should read --$C_6H_{13}$--.
No. 87, "$C_6H_{11}$" should read --$C_5H_{11}$--.
No. 88, "$C_6H_{17}OCH_2CH_2$" should read --$C_8H_{17}OCH_2CH_2$--.
No. 90, "$C_4H_8$" should read --$C_4H_9$--.
No. 91, "$C_7H_{16}$" should read --$C_7H_{15}$--.
No. 92, "$C_5H_{13}$" should read --$C_6H_{13}$--.
No. 94, "$C_6H_{17}$" should read --$C_8H_{17}$--.
No. 102, "$C_6H_{11}$" should read --$C_5H_{11}$--.
No. 104, "$C_5H_{17}$" should read --$C_8H_{17}$--.

UNITED STATES PATENT AND TRADEMARK OFFICE
CERTIFICATE OF CORRECTION

PATENT NO. : 5,841,497
DATED : November 24, 1998
INVENTOR(S) : KOICHI SATO ET AL.

It is certified that error appears in the above-indentified patent and that said Letters Patent is hereby corrected as shown below:

COLUMN 57

Line 3, "$C_7H_{16}O$" should read --$C_7H_{15}O$--.

COLUMN 61

Line 49, "$C_6H_{11}$" should read --$C_5H_{11}$--.
    Line 50, "$C_6H_{11}$" should read --$C_5H_{11}$--.
    Line 57, "$C_{17}H_{15}$" should read --$C7_5H_{15}$--.

COLUMN 66

Line 20, "$(I_s-S^s)$" should read --$(I_s-S_s)$--.

COLUMN 67

Line 16, "compounds" should read --compounds in--.
    Line 19, "<Porfluoroalkyl-type" should read
      --<Perfluoroalkyl-type--.

COLUMN 69

Line 30, "$\Delta T(25)_{50}$" should read --$\Delta T(25)$--.

COLUMN 73

Line 22, "independently" (second occurrence) should
      be deleted.
    Line 40, "are" should be deleted.

UNITED STATES PATENT AND TRADEMARK OFFICE
CERTIFICATE OF CORRECTION

PATENT NO. : 5,841,497
DATED : November 24, 1998
INVENTOR(S) : KOICHI SATO ET AL.

It is certified that error appears in the above-indentified patent and that said Letters Patent is hereby corrected as shown below:

<u>COLUMN 74</u>

Line 5, "-C=C-," should read ---C≡C---.
Line 20, "o)wa" should read --O)wa--.

<u>COLUMN 75</u>

Line 51, "|." should read --Å.--.
Line 57, "independently" (second occurrence) should be deleted.

<u>COLUMN 76</u>

Line 8, "are" should be deleted.
Line 39, "-C=C-," should read ---C≡C-,--.

Signed and Sealed this

Twenty-sixth Day of October, 1999

Attest:

Q. TODD DICKINSON

*Attesting Officer*       *Acting Commissioner of Patents and Trademarks*